United States Patent
Horie et al.

(10) Patent No.: US 6,877,383 B2
(45) Date of Patent: Apr. 12, 2005

(54) CAPACITIVE TYPE PRESSURE SENSOR

(75) Inventors: Junichi Horie, Hitachinaka (JP); Yasuo Onose, Tokai-mura (JP); Norio Ichikawa, Mito (JP); Seiji Kuryu, Hitachinaka (JP); Satoshi Shimada, Hitachi (JP); Akihiko Saito, Hadano (JP); Keiji Hanzawa, Mito (JP); Masahiro Matsumoto, Hitachi (JP); Hiroshi Moriya, Chiyoda-machi (JP); Akio Yasukawa, Kashiwa (JP); Atsushi Miyazaki, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 101 days.

(21) Appl. No.: 10/247,637

(22) Filed: Sep. 20, 2002

(65) Prior Publication Data

US 2003/0019299 A1 Jan. 30, 2003

Related U.S. Application Data

(63) Continuation of application No. 09/282,154, filed on Mar. 31, 1999, now abandoned.

(30) Foreign Application Priority Data

| Mar. 31, 1998 | (JP) | 10-85444 |
| Mar. 31, 1998 | (JP) | 10-85641 |
| Sep. 21, 1998 | (JP) | 10-266426 |

(51) Int. Cl.[7] ............................................... G01L 9/00
(52) U.S. Cl. ...................................................... 73/754
(58) Field of Search ........................ 73/700, 718, 721, 73/722, 753, 754

(56) References Cited

U.S. PATENT DOCUMENTS

| 4,766,666 A | * | 8/1988 | Sugiyama et al. | 29/610 SG |
| 4,771,638 A | * | 9/1988 | Sugiyama et al. | 73/721 |
| 4,833,920 A | * | 5/1989 | Knecht et al. | 73/717 |

(Continued)

FOREIGN PATENT DOCUMENTS

| EP | 0 385 574 | 9/1990 |
| JP | 62-232171 | 10/1987 |

(Continued)

OTHER PUBLICATIONS

Dirk De Bruyker et al., "A Combined Piezoresistive/capacitive Pressure Sensor with Self–test Function based on Thermal Actuation", 66 Sensors and Actuators 1–3, 70–75 (1998).

European Search Report for EP 99 10 5163 (dated Apr. 26, 2001).

Primary Examiner—Max Noori
(74) Attorney, Agent, or Firm—Crowell & Moring LLP

(57) ABSTRACT

By sealing a diaphragm with less processes and lower cost and reducing deformation due to remaining stress, a stable and highly reliable pressure sensor construction is proposed. The pressure sensor is low in measurement error and small in floating capacitance and leakage current and good in characteristic. As a means to attain the above object, a polycrystalline silicon diaphragm is sealed with a silicon oxide film deposited through a LPCVD method and then completely covered. The diaphragm is placed on a surface of a semiconductor substrate with a nearly constant gap of 0.15 to 1.3 $\mu$m, and has difference-in-grade constructions of a deformation reducing means due to remaining stress.

2 Claims, 14 Drawing Sheets

U.S. PATENT DOCUMENTS

| | | | |
|---|---|---|---|
| 4,849,071 A | | 7/1989 | Evans et al. |
| 4,903,000 A | * | 2/1990 | Yajima et al. .................. 338/4 |
| 5,167,158 A | * | 12/1992 | Kamachi et al. ............... 73/727 |
| 5,242,863 A | * | 9/1993 | Xiang-Zheng et al. ...... 437/228 |
| 5,316,619 A | * | 5/1994 | Mastrangelo ............... 156/644 |
| 5,335,550 A | * | 8/1994 | Satou ........................... 73/727 |
| 5,344,523 A | * | 9/1994 | Fung et al. .................. 156/628 |
| 5,471,086 A | * | 11/1995 | Ipposhi et al. ............... 257/417 |
| 5,668,033 A | * | 9/1997 | Ohara et al. ................. 438/113 |
| 5,801,313 A | * | 9/1998 | Horibata et al. ............... 73/718 |
| 5,996,419 A | * | 12/1999 | Sokn ........................... 73/706 |
| 6,109,113 A | * | 8/2000 | Chavan et al. ................ 73/718 |
| 6,653,702 B2 | * | 11/2003 | Ishio et al. .................. 257/419 |

FOREIGN PATENT DOCUMENTS

| | | |
|---|---|---|
| JP | 62-502645 | 10/1987 |
| JP | 63-025982 | 2/1988 |
| JP | 64-013773 | 1/1989 |
| JP | 04-278464 | 10/1992 |
| JP | 06-050986 | 2/1994 |
| JP | 06-252420 | 9/1994 |
| JP | 6-252420 | 9/1994 |
| WO | 86/06548 | 11/1986 |

* cited by examiner

CAPACITIVE TYPE PRESSURE SENSOR

This application is a continuation of application Ser. No. 09/282,154, filed Mar. 31, 199, now abandoned.

BACKGROUND OF THE INVENTION

The present invention relates to a capacitive type pressure sensor for detecting fluid pressure, and particularly to a construction of a pressure sensor used for controlling an engine of vehicle and a method of manufacturing the sensor utilizing a semiconductor micro-machining technology.

As a conventional pressure sensor, pressure sensors are disclosed, for example, in Japanese Patent Publication No.62-502645 and Japanese Patent Laid-open No.6-252420.

Japanese Patent Publication No.62-502645 proposes a construction of a pressure sensor and a method of manufacturing the sensor. The pressure sensor is composed of a semiconductor substrate; a solid material having a central portion capable of being deformed, the central portion being arranged on the substrate though a cavity, a peripheral portion bonded to the substrate and an etch channel portion extending to the central portion through the peripheral portion; and a material for sealing the etch channel.

Japanese Patent Laid-open No.6-252420 proposes a pressure sensor which comprises a first electrode which is formed by doping a surface of a semiconductor substrate; a second electrode made of a polycrystalline diaphragm which is made conductive by doping, the second electrode being arranged above the first electrode; a cavity formed between the first and the second electrodes; and a plug for sealing the cavity selectively deposited in an opening portion which is formed so as to penetrate a layer of the diaphragm, wherein the second electrode of diaphragm is deformed by a pressure difference between the diaphragm cavity and the external, and a change in electric capacitance due to the deformation is detected.

SUMMARY OF THE INVENTION

However, as problems when a capacitive semiconductor pressure sensor is fabricated on a surface of a semiconductor substrate, there are problems in that the capacitive semiconductor pressure sensor can not be manufactured at a low cost because the method of sealing the diaphragm is complex, and that design performance can not be obtained due to change in the design value of a cavity size or an amount of distortion because the diaphragm displacing depending on a pressure is elastically deformed by its own remaining stress.

An object of the present invention is to provide a pressure sensor in which the diaphragm can be sealed through a small number of processes and at a low cost.

The above object can be attained by the capacitive semiconductor pressure sensor comprising a semiconductor substrate and a diaphragm having a stage part for being fixed onto a surface of the semiconductor substrate, the diaphragm being displaced corresponding to a change of pressure, wherein a cavity having a nearly uniform gap of 0.1 to 1.3 $\mu$m is formed between the surface of the semiconductor substrate and the diaphragm, and the cavity is air-tightly sealed by a silicon oxide film deposited through an LPCVD (Low Pressure Chemical Vapor Deposition) method.

Furthermore, other object of the present invention is to provide a pressure sensor which is capable of coping with the electromagnetic wave noise from the charged particles in the fluid to be measured and from the external even without the container for shielding the electromagnetic waves or the stopper having a magnetic wave shield, and to realize such a countermeasure against noise without deteriorating the sensitivity of the diaphragm and with a low cost.

In order to attain the above-mentioned object, the present invention essentially proposes the following semiconductor pressure sensor.

That is, a semiconductor pressure sensor comprising a diaphragm being deformed corresponding to pressure of a fluid to be measured, wherein a pressure receiving surface of the diaphragm to be in contact with the fluid to be measured is coated with an electromagnetic shielding electric conductive film through an insulation film, the electromagnetic shielding electric conductive film being in a grounded state.

According to the above-described construction, even if charged particles in the fluid to be measured are about to attach onto the diaphragm surface, the diaphragm surface can be maintain in zero electrical potential by releasing the charge of the charged particles through the electromagnetic shielding electric conductive film and the grounding lead wire formed on the diaphragm surface. Further, the electromagnetic shielding electric conductive film prevents the electromagnetic wave noise which is produced by the charged particles in the fluid to be measured from entering into the sensor, and electrically shields the diaphragm from the external electromagnetic noise.

According to the present invention, since the electromagnetic shielding electric conductive film can cope with attaching of the charged particles in the fluid to be measured, it is sufficient that the insulation film arranged thereunder has a role to electrically insulate the electromagnetic shielding electric conductive film and the diaphragm (which is formed of an electric conductive material such as a semiconductor or the like). Therefore, the insulation film can be thinned as thin as a decimal order $\mu$m (for instance, 0.2 $\mu$m) because the thickness of the insulation film need not be increased because of the reason described in FIG. 8 (that is, there is no need to take the countermeasure against attachment of the charged particles onto the insulation film). In addition to this, since an acceptable thickness of the electromagnetic shield electric conductive film is also a decimal order $\mu$m (for instance, 0.5 $\mu$m), the thickness of the diaphragm including the two films can be made still thinner than that of a conventional one. As a result, the high sensitivity of the diaphragm can be maintained.

Furthermore, other object of the present invention is to realize a capacitive pressure sensor which can continuously change the electric capacitance by preventing the movable diaphragm from deforming in a convex state toward the pressure receiving surface side without adding high temperature heat treatment.

In order to attain the above object, the present invention is constructed as follows.

(1) A capacitive pressure sensor comprising a reference pressure chamber on a main surface of a substrate and a movable diaphragm formed through coating on the surface side of the substrate so as to cover the reference pressure chamber, therein at least one of a surface of the movable diaphragm opposite to the main surface of the substrate and a surface in the reverse side of the opposite surface has a convex shape to the main surface of the substrate in an initial state in which a detected pressure is 0 (zero).

Since in the movable diaphragm at least one of a surface of the movable diaphragm opposite to the main surface of the substrate and a surface in the reverse side of the opposite surface has a convex shape to the main surface of the substrate, that is, has a concave shape to the pressure receiving surface side in an initial state, the deformation of the movable diaphragm does not change from the convex shape to the pressure receiving surface to the concave shape even if the movable diaphragm is deformed by applying a detected pressure to the pressure receiving surface of the movable diaphragm. Therefore, the deformation of the movable diaphragm is continuously changed, and accordingly the electric capacitance is continuously changed to obtain a continuous output.

(2) Further, a capacitive pressure sensor comprising a reference pressure chamber on a main surface of a substrate and a movable diaphragm formed through coating on the surface side of the substrate so as to cover the reference pressure chamber, therein a thick wall portion projecting to a side opposite to the main surface of the substrate is formed in a peripheral portion of the movable diaphragm, and the movable diaphragm has a convex shape to the main surface of the substrate in an initial state in which a detected pressure is 0 (zero).

Since the thick wall portion projecting to a side opposite to the main surface of the substrate is formed in a peripheral portion of the movable diaphragm, the movable diaphragm is stabilized in a concave deformed state to the pressure receiving surface side in an initial state in which a detected pressure is 0 (zero) by the action of a bending moment of the thick wall portion even if the movable diaphragm is buckled.

Since the initial shape of the movable diaphragm is the concave shape to the pressure receiving surface side, the deformation of the movable diaphragm does not change from the convex shape to the pressure receiving surface to the concave shape even if the movable diaphragm is deformed by applying a detected pressure to the pressure receiving surface of the movable diaphragm. Therefore, the deformation of the movable diaphragm is continuously changed, and accordingly the electric capacitance is continuously changed to obtain a continuous output.

(3) It is preferable that in the above item (2) the internal stress of the thick wall portion is a compressed stress.

(4) Further, a capacitive pressure sensor comprising a reference pressure chamber on a main surface of a substrate and a movable diaphragm formed through coating on the surface side of the substrate so as to cover the reference pressure chamber, therein a film having an internal stress of a tensile stress is arranged on a central portion of a surface of the movable diaphragm in the reverse side of a surface opposite to the main surface of the substrate.

Since the film having an internal stress of a tensile stress is arranged on a central portion of a surface of the movable diaphragm, the movable diaphragm is deformed in a concave deformed state to the pressure receiving surface side by the action of a bending moment of the above-mentioned film even if the movable diaphragm is buckled.

Therefore, even if the movable diaphragm is deformed by applying a detected pressure to the pressure receiving surface of the movable diaphragm, the deformation of the movable diaphragm is continuously changed, and accordingly the electric capacitance is continuously changed to obtain a continuous output.

PREFERRED EMBODIMENT OF THE PRESENT INVENTION

Figure 1:
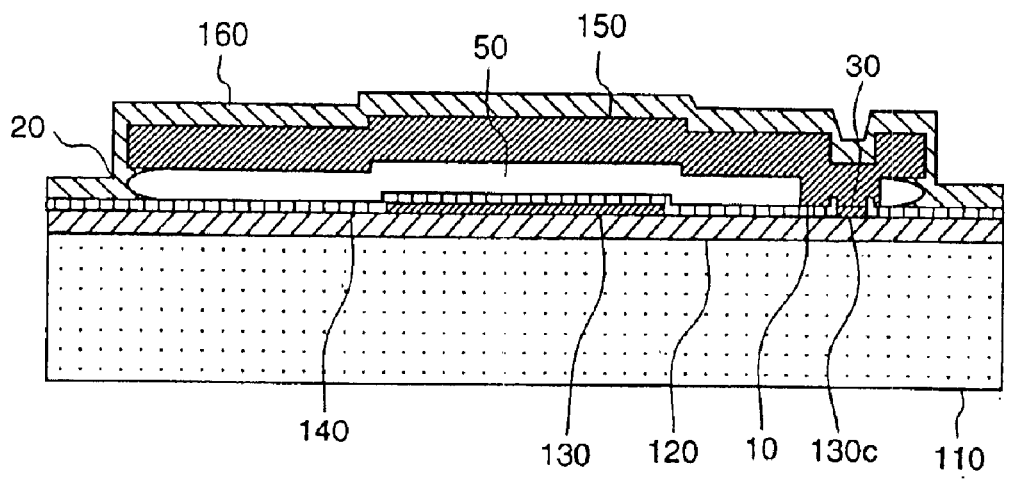
FIG. 1 is a view showing the cross-sectional shape of a first embodiment in accordance with the present invention.

FIG. 1 is a cross-sectional view showing a first embodiment of an electrostatic capacitive pressure sensor to which the present invention is applied. FIG. 2 is a plan view showing the first embodiment.

The pressure sensor is composed of stages 10, a diaphragm sealing part 20, a connection part 30, a cavity 50, a semiconductor substrate 110, a dielectric body 120, a fixed electrode 130, a diaphragm electric wiring 130c, a barrier layer 140, a diaphragm construction 150 and an LPCVD silicon oxide film 160.

A medium to be measured, for example, air applies a pressure onto the diaphragm construction 150 through the LPCVD silicon oxide film 160, and the diaphragm construction 150 is displaced corresponding to a magnitude of the pressure. The magnitude of the displacement is in proportion to the difference between a pressure in the cavity 50 and the pressure of the air. Since the cavity 50 is sealed under a vacuum condition of nearly 30 Pa to 120 Pa which is nearly equal to a vacuum when the LPCVD silicon oxide film 160 is deposited, this sensor can be used as an absolute pressure sensor. At least a surface of the diaphragm construction 150 in the side of the fixed electrode 130 or the whole of the diaphragm construction 150 is made conductive by impurity doping, which is not shown. Therefore, the pressure can be detected because the electrostatic capacitance between the fixed electrode 130 and the diaphragm construction 150 is changed corresponding to the pressure of the air.

A commonly used semiconductor such as single crystal silicon substrate, an SOI (Silicone on Insulator) substrate, an epitaxial substrate or the like may be used as the semiconductor substrate 110. In a case where a C-MOS device known as a low-cost and high integration and the pressure sensor in accordance with the present invention are formed on a single substrate together, a single crystal CZ substrate of n-type or p-type having a resistivity of 8 to 12 $\Omega$cm is used.

The dielectric body 120 may be formed by forming a thermal oxide film, a CVD (Chemical Vapor Deposition) oxide film, a CVD nitride film or the like on the semiconductor substrate 110. With taking into consideration that the specific dielectric constant of silicon oxide film is 3 to 4 and that of silicon nitride film is nearly 7, the silicon oxide film is advantageous because the floating capacitance between the fixed electrode 130 and the semiconductor substrate 110 can be made smaller in the case of the silicon oxide film. In a case where a C-MOS device and the pressure sensor are formed at a time, a thermal oxide film (a field oxide film) may be used as the dielectric body 120. Therefore, it is possible to provide a more economical pressure sensor by reducing number of processes.

In the construction, the fixed electrode 130 is not deformed by pressure because it is formed on the semiconductor substrate 110. As the fixed electrode 130, it is preferable to employ a polycrystalline silicon film which is made electrically conductive by being doped with an impurity. Particularly, it is economical that the fixed electrode 130 is worked using the same material as that of a gate wiring of the CMOS device at a time. Similarly, the diaphragm wiring 130c is also formed using the same material as that of the fixed electrode 130, and serves as the role of a lead wiring from the diaphragm construction 150. Any electrically conductive film can be substitutionally used for both of the fixed electrode 130 and the fixed electrode wiring 130a, and a silicide film is also suitable.

The connection part 30 is constructed so as to make electrically contact between the diaphragm construction 150 and the diaphragm wiring 130c by removing a part of the barrier layer 140 on the diaphragm wiring 130c.

The barrier layer 140 is brought into contact with the fixed electrode 130 to prevent electrically short circuiting when an over load is applied to the diaphragm construction 150, and reduces surface leakage current between the diaphragm construction 150 and the fixed electrode 130. Further, the barrier layer 140 serves as the role of an etching barrier when the cavity 50 is formed by removing through etching of an isolation layer 170 of a sacrificed layer.

The cavity 50 determines a capacitive gap between the fixed electrode 130 and the diaphragm construction 150, and formed by removing the isolation layer 170 deposited in a uniform thickness of 0.1 to 1.3 $\mu$m through etching. Therefore, the cavity 50 is formed so as to keep the uniform gap nearly 0.1 to 1.3 $\mu$m.

As an example of the isolation layer 170 which is not shown in the figure because it is removed through etching, a silicon oxide film such as a PSG or the like may be used.

The stage 10 is a part for mechanically fixing the diaphragm construction 150 to the semiconductor substrate 110. The stage 10 can be obtained by partially etching the isolation layer 170 after forming a mask through lithography and then forming the diaphragm construction 150.

Although the polycrystalline silicon is most suitable for the diaphragm construction 150 in the present embodiment, it is possible to obtain a pressure sensor having an air-tightly sealed diaphragm construction 150 even employing an electrically conductive or an insulation film made of the other materials. Since the diaphragm construction 150 is deposited on the isolation layer 170 deposited in a uniform thickness of 0.1 to 1.3 $\mu$m, the diaphragm construction 150 is formed so as to have a nearly uniform gap to the base after etching the isolation layer 170.

The diaphragm sealing part 20 is an edge portion of the diaphragm construction 150, and a part for air-tightly sealing the diaphragm construction 150 using the LPCVD silicon oxide film 160. A shape of the diaphragm sealing part 20 depends on a manufacturing condition of the LPCVD silicon oxide film 160 and a size of the cavity 50.

In regard to the pressure sensor in accordance with the present invention, the conditions of the sealing material to be taken into consideration when the cavity 50 is air-tightly sealed are that the sealing material is of a compact film property in order to keep the air-tightness of the cavity 50 for a long term, and that the sealing material forms the cavity 50, which does not essentially hinder the diaphragm construction 150 from deforming by pressure, between the fixed electrode 130 and the diaphragm construction 150, and that the sealing material keeps the inside of the cavity 50 in a vacuum in order to use as a reference pressure of the pressure sensor, and that the sealing material has an insulation property in order to prevent occurrence of charge accumulation or current leakage in the diaphragm construction 150. In the present invention, the LPCVD (Low Pressure Chemical Deposition) silicon oxide film is employed as a material satisfying all of these conditions. Because the silicone oxide film the LPCVD silicon oxide film is deposited by thermal energy at a high temperature (700 to 800° C.), the LPCVD silicon oxide film has a film property more compact than a film formed through the other fabrication method depositing, for example, at 400° C. such as a plasma CVD method. Further, since the surface of the semiconductor substrate has a step surface formed by the sensor construction body, it is necessary to take into consideration a step coverage, that is, a film attaching state to the surface of the substrate and the surface perpendicular to the substrate. In the LPCVD silicon oxide film, it is possible to form a deposited film in the side surface portion which has a thickness thicker than 80% of a thickness in the surface portion. Although an LPCVD silicon nitride film can be considered as another material, the LPCVD silicon nitride film has a disadvantage in that cracks may occur in the film caused by remaining stress in the film itself when silicon nitride is deposited up to a thickness above 2500 Å because the remaining stress (an actual measured value of approximately 1.5 GPa) of the silicon nitride film at depositing is very large compared to that (an actual measured value of approximately 0.15 GPa) of silicone oxide film.

The condition of fabricating the LPCVD silicon oxide film 160 in this embodiment is that a deposition temperature is 720 to 780° C., a deposition pressure is 30 to 120 Pa, and a deposition gas used is ethyl silicate (TEOS: tetraethyl-orthosilicate)+oxygen ($O_2$).

Figure 8:
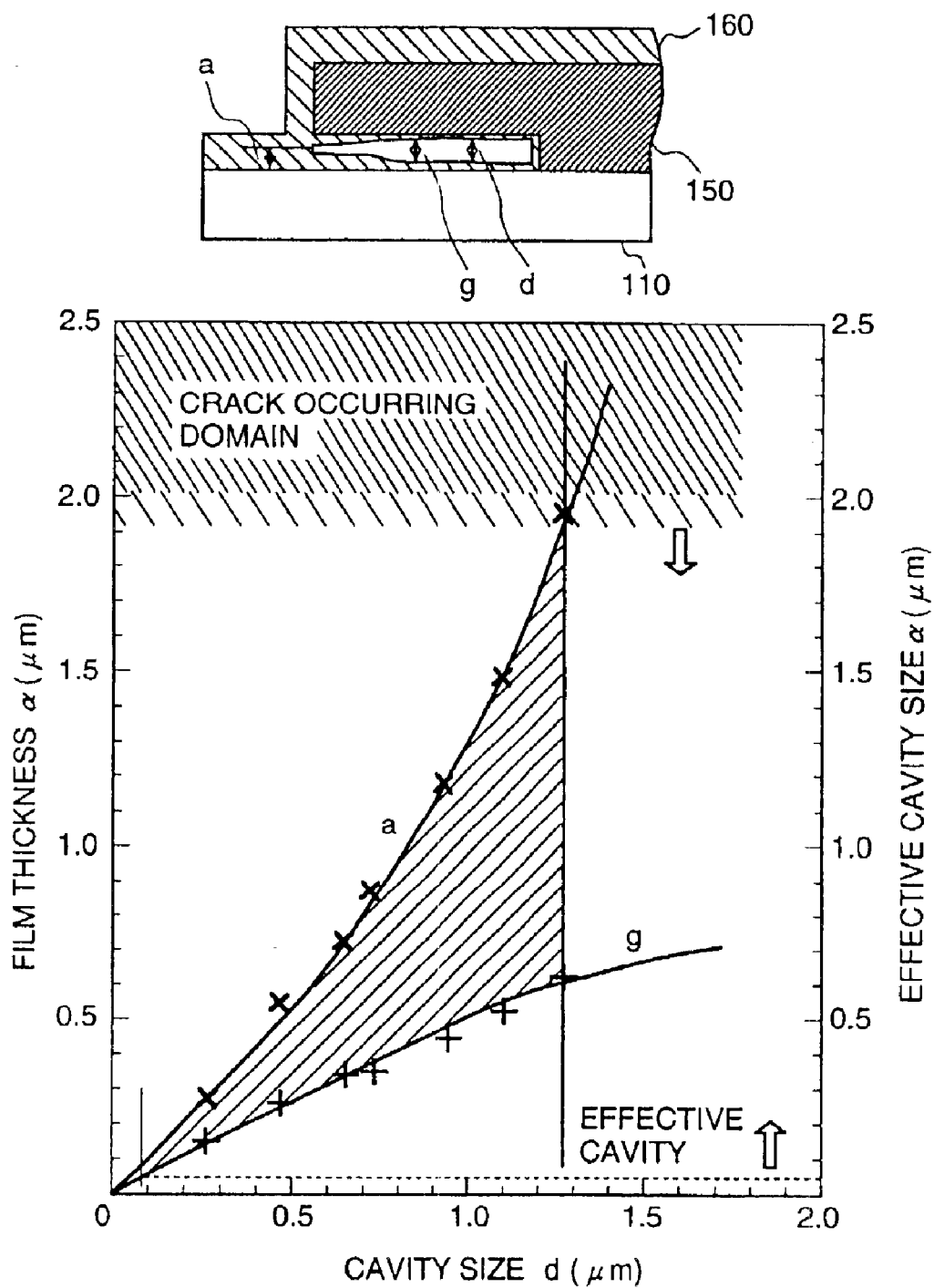
FIG. 8 is a diagram showing the condition capable of air-tightly sealing the pressure sensor in accordance with the present invention.

FIG. 8 shows an test result showing the condition capable of air-tightly sealing the cavity 50 using the LPCVD silicon oxide film 160 formed under the fabrication condition described above the LPCVD silicon oxide film 160 is deposited until the cavity 50 of a sample having a cavity size d of 0.3 to 2.0 μm is air-tightly sealed. After that, a cross section of the sample is observed using a SEM (Scanning Electron Microscope) to measure a minimum film thickness which is necessary to seal the cavity a and an effective cavity size g. The minimum film thickness which is necessary to seal the cavity a is a thickness from the semiconductor substrate 110 at a position near the edge portion of the diaphragm construction 150 where the cavity 50 is completely sealed. The effective cavity size g is a gap of the cavity at a point 10 μm inside from the measuring point of a. The minimum film thickness which is necessary to seal the cavity a is increased as the cavity size d is increased as shown by a line a in the figure. The effective cavity size g is also increased as the cavity size d is increased as shown by a line g in the figure.

Cracks occurs when the film thickness of the LPCVD silicon oxide film 160 is deposited above 1.9 to 2.0 μm. It is said that this is because the remaining stress (thermal stress+intrinsic stress) occurring at depositing the LPCVD silicon oxide film 160 exceeds a fracture strength of the LPCVD silicon oxide film 160 itself. Such cracks become a dust source to decrease the yield of semiconductor. Therefore, the practically maximum effective cavity size d is limited to a value below 1.3 μm. On the other hand, in a case where the cavity size d is below 0.1 μm, the LPCVD silicon oxide 160 penetrates into the cavity 50 to almost eliminate the essentially effective cavity size and displacement of the diaphragm construction 150 is blocked to eliminate the function as the pressure sensor. Therefore, the essentially effective cavity size d is above 0.1 μm.

By the construction as described above, the cavity 50 of 0.1 to 1.3 μm can be air-tightly sealed to a nearly vacuum state of 30 Pa to 120 Pa through a less number of processes, and it is possible to provide a pressure sensor which is low in cost, good in characteristic because of a small floating capacitance and high in stability and reliability as vehicle use.

In addition, since the pressure sensor can be manufactured using a general IC manufacturing process, the pressure sensor can be integrated together with the circuit portion in a one-chip, and accordingly can be made small in size and low in cost.

Figure 2A:
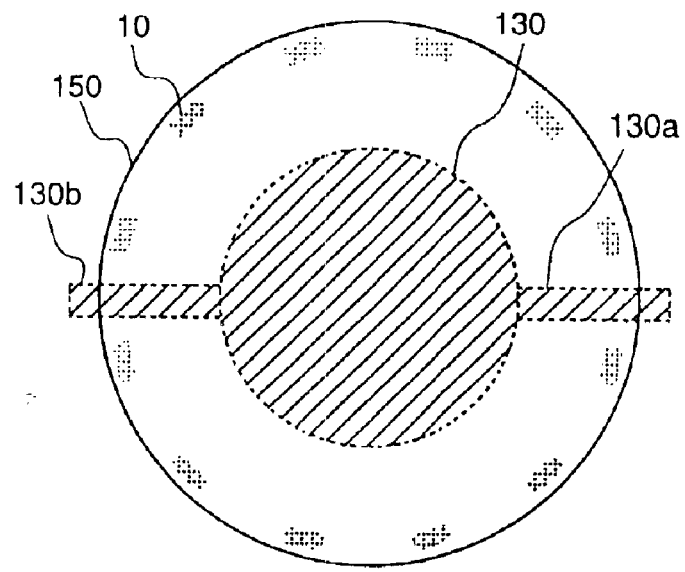
FIG. 2 is a plan view showing the first embodiment in accordance with the present invention.
Figure 2B:
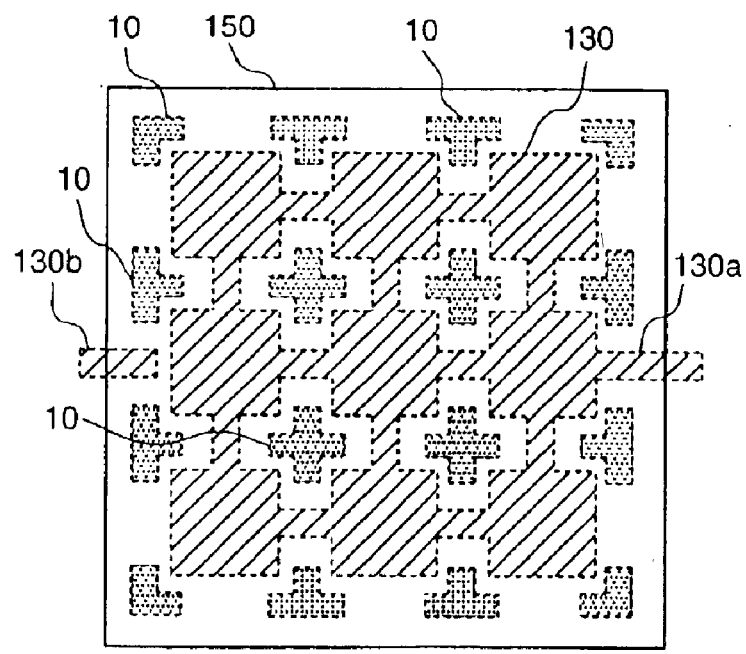

FIG. 2(a) is a plan view showing the arrangement of the disk-shaped diaphragm constriction 150 and the stages 10, and FIG. 2(b) is a plan view showing the arrangement of the square diaphragm 150, the divided electrode 130 and the divided stages 10.

The pressure sensor of FIG. 2(a) is an example in which the diaphragm construction 150 and the fixed electrode 130 are formed in a disk shape so as not to occur heterogeneity in the elastic deformation by the pressure and the remaining stress, and the stages 10 are divisionally and concentrically arranged in the outer periphery of the diaphragm construction 150. The spacing and the number of the stages 10 are required to be arranged so as to not affect etching of the isolation layer 170.

The fixed electrode wiring 130a is formed by leading out the wiring of the fixed electrode 130 outside the diaphragm construction 150. A dummy wiring 130b is arranged point-symmetrically with respect to the fixed electrode wiring 130a in order to compensate the asymmetry of the diaphragm construction 150 caused by the fixed electrode wiring 130a.

The pressure sensor of FIG. 2(b) is an example in which the diaphragm construction 150 and the fixed electrode 130 are divisionally arranged in a square shape so as not to occur heterogeneity in the elastic deformation caused by the pressure applied to the diaphragm construction 150 and the remaining stress in the diaphragm construction 150 itself. The stages 10 are arranged so as to equally divide the diaphragm construction 150. In this case, similarly to the case of FIG. 2(a), the symmetry of the diaphragm construction 150 can be maintained by arranging a dummy wiring 130b.

By the construction described above, the measurement error of the pressure sensor can be reduced because the heterogeneity of deformation in the diaphragm construction 150 can be reduced.

Figure 3:
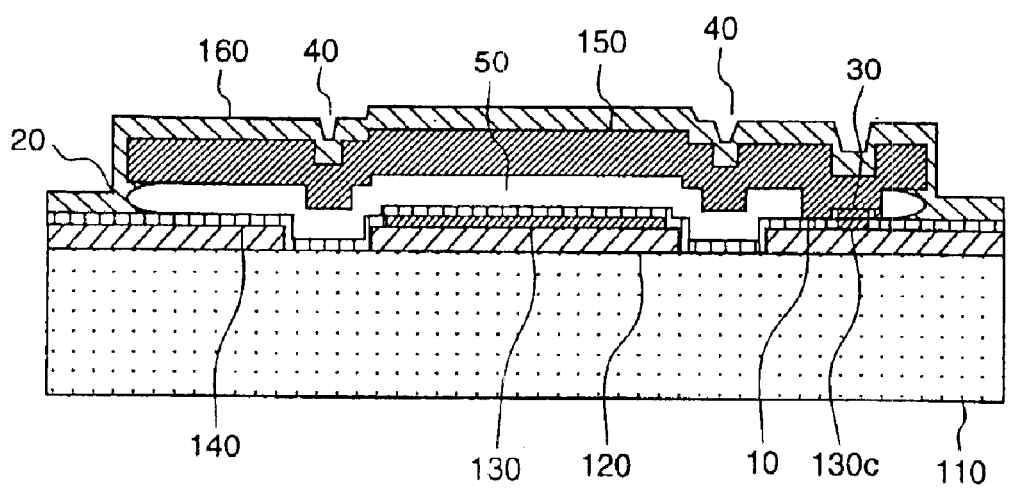
FIG. 3 is a view showing the cross-sectional shape of a second embodiment in accordance with the present invention.

FIG. 3 is a cross-sectional view showing a second embodiment of an electrostatic capacitive pressure sensor to which the present invention is applied, and FIG. 4 is a plan view showing the second embodiment.

The pressure sensor is composed of stages 10, a diaphragm sealing part 20, a connection part 30, a difference-in-grade construction 40, a cavity 50, a semiconductor substrate 110, a dielectric body 120, a fixed electrode 130, a barrier layer 140, a diaphragm construction 150 and an LPCVD silicon oxide film 160.

A different point of the pressure sensor of FIG. 3 from the pressure sensor of FIG. 1 is that the difference-in-grade construction 40 is formed in the diaphragm construction 150 by providing a step in the dielectric body 120. The barrier layer 140 and the isolation layer 170 deposited through CVD after forming the step in the dielectric body 120 have a nearly uniform thickness, the cavity 50 is maintained nearly constant over the diaphragm construction 150 even after the difference-in-grade construction is formed. Although remaining stress caused in the diaphragm construction 150 deforms to bend the diaphragm construction 150 itself, the displacement of the diaphragm construction 150 itself can be reduced by the effect of the difference-in-grade construction 40 to reducing the bending deformation.

In a case where the diaphragm construction 150 is made of polycrystalline silicon, the diaphragm construction 150 is formed by the LPCVD method at a temperature of 560° C. to 680° C. In this case, it is known that the remaining stress is caused by thermal stress caused when the temperature returned to room temperature from the deposition temperature and by intrinsic stress inherent in the film itself. The thermal stress is caused by a difference between the thermal expansion coefficients of the semiconductor substrate 110 and the polycrystalline silicon. Although the intrinsic stress largely varies depending on the fabrication method of the polycrystalline silicon, it is known that the intrinsic stress is caused by difference in degree of crystallization and that there is a stress distribution in a direction of the film thickness. The difference-in-grade construction 40 acts as a limb to prevent the diaphragm construction 150 from deforming due to the remaining stress. The similar effect can be attained not only by the depression-shaped difference-in-grade construction 40 but by a projection-shaped construction by the fixed electrode 130. Another advantage of the difference-in-grade construction 40 is that a deforming direction of the diaphragm construction 150 due to the remaining stress can be restricted. The deformation can be restricted to the lower side when the limb is formed in a depression shape, and the deformation can be restricted to the upper side when the limb is formed in a projection shape.

By the construction described above, since the diaphragm construction 150 has the difference-in-grade construction 40 of means for reducing deformation due to the remaining stress, the error of the pressure sensor can be reduced because it is possible to prevent the initial position from deviating from a designed value and to control the direction of the deformation.

Figure 4A:
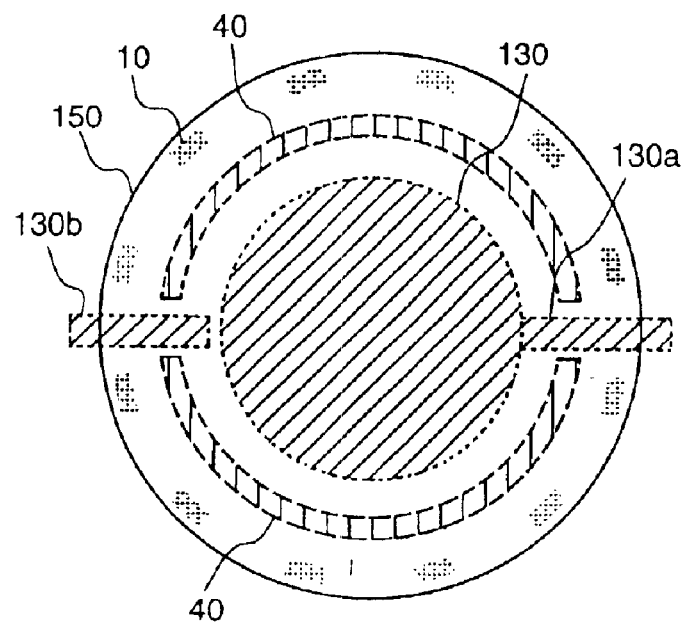
FIG. 4 is a plan view showing the second embodiment in accordance with the present invention.
Figure 4B:
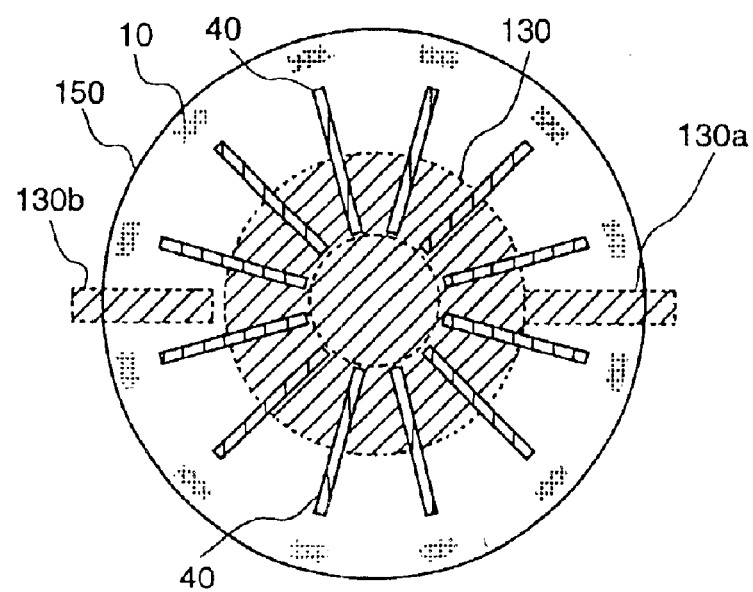

FIG. 4 shows planar arrangement of the difference-in-grade constructions. FIG. 4(a) shows a feature in which the difference-in-grade constructions 40 are concentrically arranged on the disk-shaped diaphragm construction 150, and FIG. 4(b) shows a feature in which the difference-in-grade constructions 40 are arranged in the radial directions on the disk-shaped diaphragm construction 150. The construction of FIG. 4(a) is effective for a case where the remaining stress in the diaphragm construction 150 has a bending moment having a distribution in the thickness direction, and the construction of FIG. 4(b) is effective for a case where the diaphragm construction 150 has the remaining stress in the planar direction.

By the construction described above, since the diaphragm construction has the difference-in-grade constructions of the deformation reducing means due to remaining stress, the measurement error can be reduced and it is possible to provide the pressure sensor good in characteristic for vehicle use.

FIG. 5 shows a manufacturing process of the pressure sensor in accordance with the present invention.

Figure 5A:
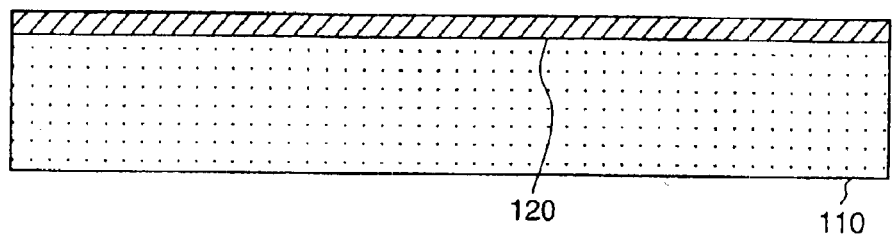
FIG. 5 is a view showing a manufacturing process in accordance with the present invention.

The dielectric body 120 is formed on the semiconductor substrate 120 to be used for IC manufacturing through thermal oxidation of the semiconductor substrate 110 (FIG. 5(a)). Next, after masking by photo-lithography the difference-in-grade constructions 40 are formed on the dielectric body 120 by etching desired portions (FIG. 5(b)). The first embodiment can be fabricated through the common processes except for eliminating the process of FIG. 5(b). FIG. 5(c) shows a feature in which the fixed electrode 130 and the diaphragm wiring 130c are formed with an electric conductive polycrystalline silicon or the like through a photo-etching process at a time.

Figure 5B:
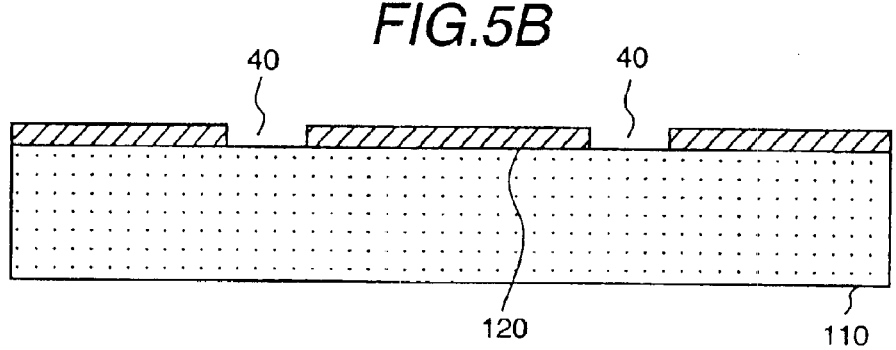
Figure 5C:
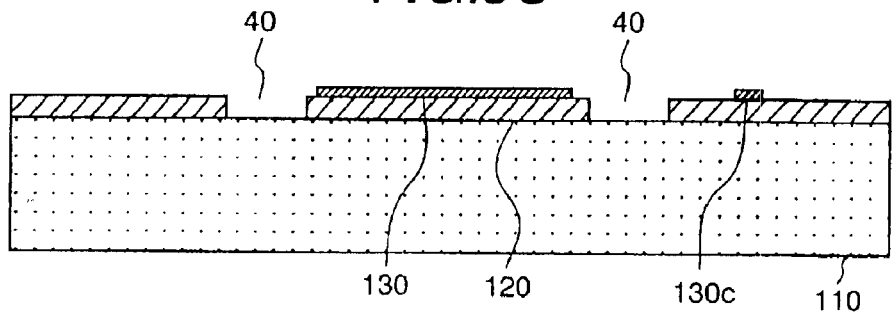

As an alternative of the processes of FIG. 5(a) to (c), there is a method in which the processes are simplified by commonly processing the field oxide film of a MOS device and the dielectric body 120, and by commonly processing the gate wiring and the fixed electrode 130. In this case, the processes of FIG. 5(a) to (c) can be replaced the well known processes to be described below. Initially, a nitride film is formed on the semiconductor substrate 110, and portions to form the field oxide film on the nitride film are removed. Next, thermal oxidation is performed to selectively form the field oxide film, and then the nitride film is removed. Although the gate wiring is formed with the doped polycrystalline silicon film, the silicide film or the like, the fixed electrode 130 and the diaphragm wiring 130c are also formed on the field oxide film at a time.

Figure 5D:
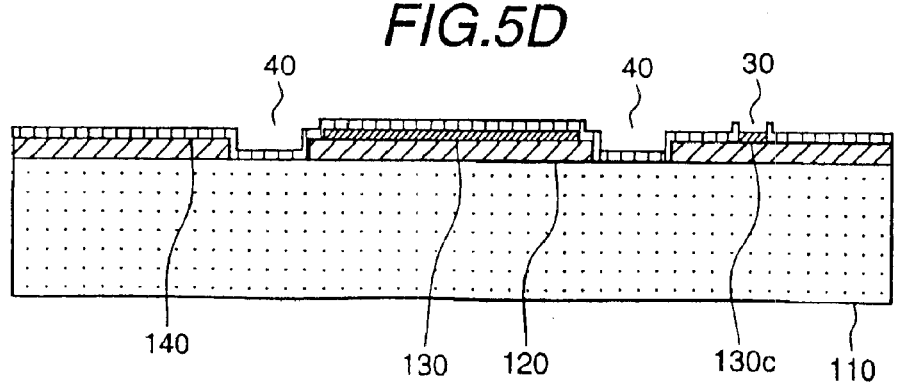
Figure 6A:
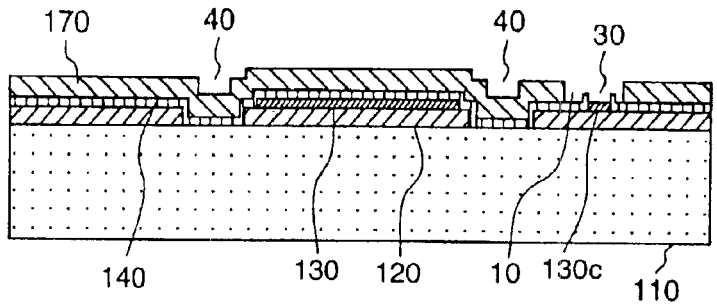
FIG. 6 is a view showing a manufacturing process in accordance with the present invention.
Figure 6B:
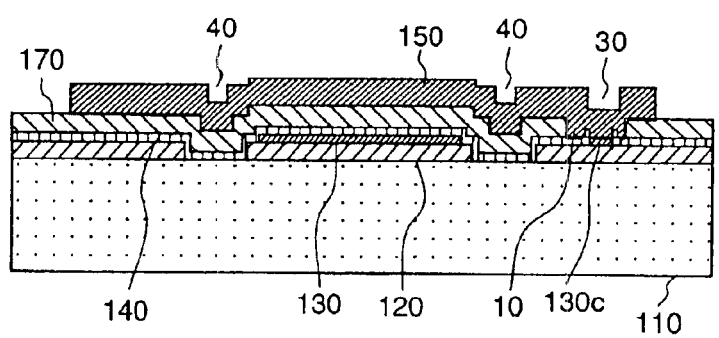
Figure 6C:
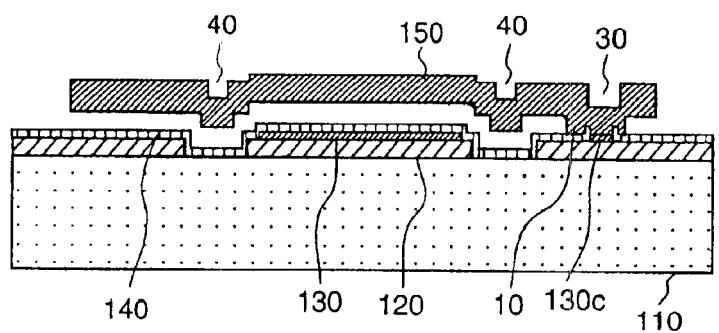
Figure 6D:
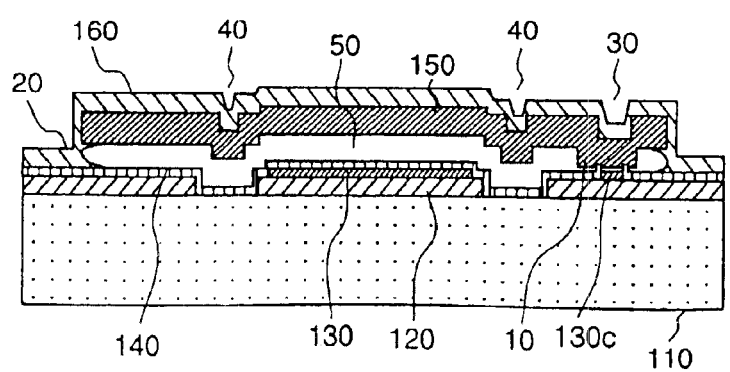

FIG. 5(d) shows a feature in which after depositing the barrier layer 140 of the LPCVD nitride film, the connection part 30 of the diaphragm wiring 130c and the diaphragm construction 150 is formed through photo-etching process. FIG. 6(e) shows a feature in which after depositing the isolation layer 170, the stages 10 for the diaphragm construction 150 to the semiconductor substrate 110 is formed. The thickness of the isolation layer 170 is set to 0.1 to 1.3 µm. A silicon oxide film is used for the isolation layer 170 in most cases, and the present embodiment employs PSG of an HF group etching solution which is high in etching speed.

FIG. 6(f) shows a feature in which after depositing on the isolation layer having the stages 10 formed, the diaphragm construction 150 is formed on the isolation layer as a base through photo-etching. As the method to make the diaphragm construction 150 electrically conductive, there is a method to dope the diaphragm construction 150 with an impurity. As the impurity doping method, there is a method of performing phosphorus treatment of solid diffusion or ion injection after depositing the polycrystalline silicon as the diaphragm construction 150. In addition to these, there is a method of depositing a doped polycrystalline silicon by mixing an impurity during depositing the polycrystalline silicon. In a case where a PSG highly containing a p-type or n-type impurity in the isolation layer 170, there is a method that the polycrystalline silicon is made electrically conductive by performing annealing after depositing the polycrystalline silicon to solid-diffuse the impurity in the PSG into the polycrystalline silicon.

FIG. 6(g) shows a feature in which the isolation layer 170 formed is removed through etching. In a case where the barrier layer 140 of the LPCVD nitride film and the isolation layer 170 of PSG are combined, wet etching can be performed using an HF group etching solution. In the present embodiment, etching can be performed for the diaphragm construction 150 having a diameter up to 400 µm at maximum by selection ratio of the side etching amount of the isolation layer 170 and the barrier layer 140.

FIG. 6(h) shows a feature in which the diaphragm construction 150 is air-tightly sealed with the LPCVD silicon oxide film 160.

The condition of fabricating the LPCVD silicon oxide film 160 in this embodiment is that a deposition temperature is 720 to 780° C., a deposition pressure is 30 to 120 Pa, and a deposition gas used is ethyl silicate (TEOS: tetraethylorthosilicate)+oxygen ($O_2$). Therefore, the cavity 50 can be air-tightly sealed in a nearly vacuum state of 30 Pa to 120 Pa which is the pressure at depositing the LPCVD silicon oxide film 160.

By the present processes, it is possible to manufacture a capacitive semiconductor pressure sensor integrated on a single substrate together with a CMOS circuit, and to provide a pressure sensor which is small in size and low in cost and is hardly affected by remaining stress of the diaphragm construction 150.

Although description has been made on the embodiments in which the present invention is applied to the electrostatic capacitive pressure sensor. The present invention can be applied to a piezo-resistive pressure sensor which is different in detection principle.

Figure 7:
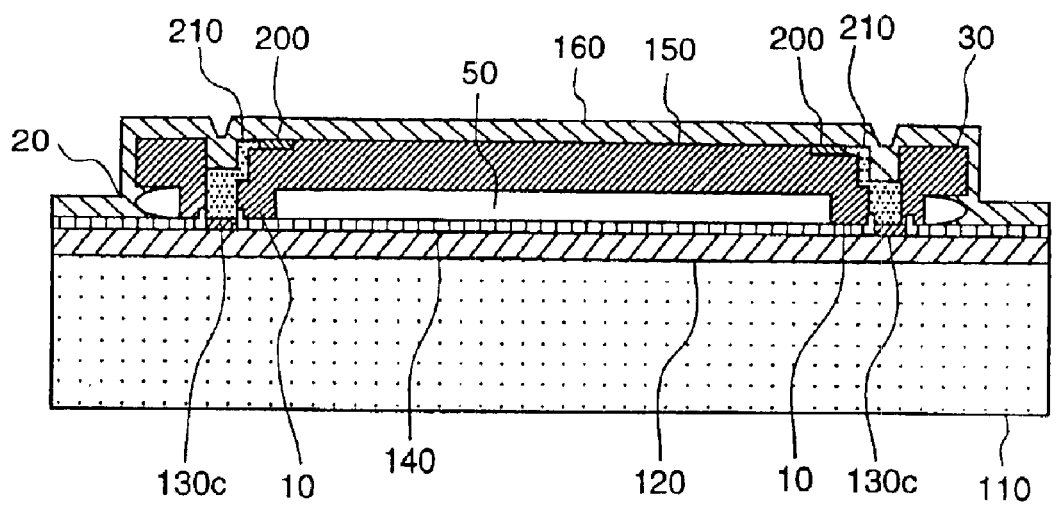
FIG. 7 is a view showing the cross-sectional shape of a third embodiment in accordance with the present invention.

FIG. 7 is a cross-sectional view showing a third embodiment of a piezo-resistive pressure sensor to which the present invention is applied.

The pressure sensor is composed of stages 10, a diaphragm sealing part 20, a connection part 30, a cavity 50, semiconductor substrate 110, a dielectric body 120, a diaphragm electric wiring 130c, a barrier layer 140, a diaphragm construction 150, an LPCVD silicon oxide film 160, a piezo-resistive element 200 and an electric conductive body 210.

Pressure of a medium to be measured such as air or the like deforms the diaphragm construction 150 through the LPCVD silicon oxide film 160. The piezo-resistive element 200 arranged at a position on the diaphragm construction 150 where the deformation becomes maximum changes its resistance value corresponding to the deformation. The change in the strain resistance is transmitted to a detecting circuit through the electric conductive body 210, the connection part and the diaphragm wiring 130c. Therefore, Since the cavity 50 of 0.1 to 1.3 μm in the present embodiment can be also air-tightly sealed similarly to the case of the first embodiment, the pressure sensor can be used as an absolute pressure sensor.

The piezo-resistive element 200 is an element having an effect of changing its specific resistance by deformation. In a case where the diaphragm construction 150 is formed of polycrystalline silicon, the piezo-resistive element can be obtained by forming a part of the diaphragm construction 150 itself in a p-type or n-type impurity layer.

The electric conductive body 210 electrically connects the piezo-resistive element 200 and the diaphragm wiring 130c.

By the construction described above, the cavity 50 of 0.1 to 1.3 μm can be air-tightly sealed to a nearly vacuum state of 30 Pa to 120 Pa through a small number of processes, and it is possible to provide the stable and highly reliable pressure sensor which is small in floating capacitance and leakage current and good in characteristic for vehicle because the diaphragm is completely covered with the deposited oxide silicon film through the LPCVD method. Further, since the diaphragm construction 150 has the difference-in-grade construction 40 of means for reducing deformation due to the remaining stress, the error of the pressure sensor can be reduced because it is possible to prevent the initial position from deviating from a designed value and to control the direction of the deformation.

Furthermore, since it is possible to manufacture the capacitive semiconductor pressure sensor integrated on a single substrate together with a CMOS circuit, the one-chip pressure sensor with the circuit portion can be manufactured to reduce its size and cost.

According to the present invention, the diaphragm can be sealed with a small number of processes and with low cost.

Furthermore, other embodiments of the present invention will be described below, referring to drawings.

Figure 9:
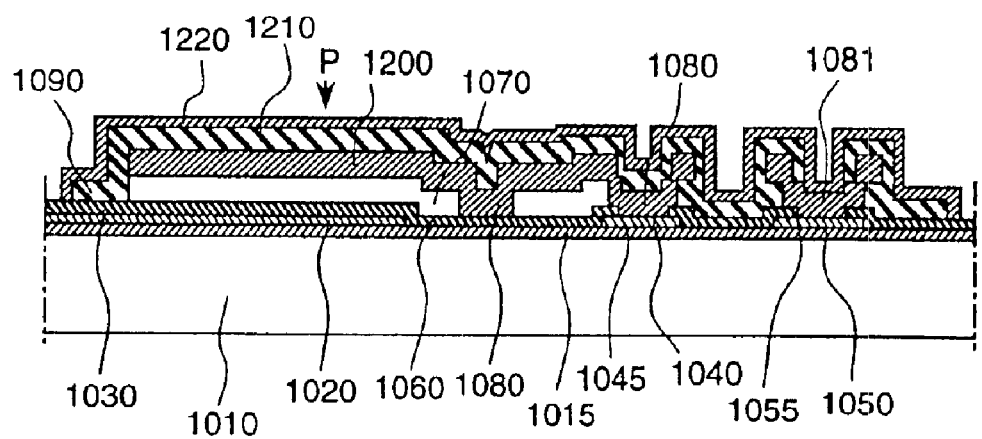
FIG. 9 is a view explaining the principle by showing a cross section of a semiconductor pressure sensor in accordance with the present invention.

FIG. 9 is a view sowing the principle of construction of a semiconductor pressure sensor of an electrostatic capacitive type which the present invention is applied to.

In a case of FIG. 9 , a reference pressure chamber 1070 and a diaphragm 1200 covering the reference pressure chamber are formed on one surface of a substrate 1010, The diaphragm 1200 is supported by a plurality of anchor parts 1080 arranged in a circumferential direction in an equal spacing and is displaced by receiving a pressure of a fluid to be measured, on a surface opposite to the reference pressure chamber 1070. A fixed electrode 1020 is formed at a position facing the diaphragm in the reference pressure chamber 1070 on the one surface of said substrate 1010. The diaphragm 1200 has an electric conductivity to serve as a movable electrode opposite to the fixed electrode 1020. The movable electrode (diaphragm) 1200 and the fixed electrode 1020 compose an electrostatic capacitor for converting a detected pressure into an electric signal.

A pressure receiving surface of the diaphragm 1200 to be in contact with the fluid to be measured is coated with an insulation film 1210, and the insulation film 1210 is further coated with an electromagnetic shielding electric conductive film 1220, and the electromagnetic shielding electric conductive film 1220 is in a grounded state (the feature of grounding to be described later).

Referring to FIG. 9, the semiconductor substrate 1010 is actually in a form of an integrated circuit, and the figure shows only the pressure sensor portion of the integrated circuit.

The semiconductor substrate of FIG. 9 is coasted with an insulation film 1015, and the fixed electrode 1020 and the lead wire 1030, a lead wire (movable electrode lead wire) 1040 of the diaphragm 1200 having an electric conductivity, a grounding lead wire 1050 of the electromagnetic shielding electric conductive film 1220 are formed on the insulation film 1015. An etching protective film 1060 is further formed thereon. The etching protective film 1060 has a role of a protective film when a sacrifice film for forming the reference pressure chamber 1070 is removed using an etching solution, which is to be described later.

The etching protective film 1060 does not cover a portion on the movable electrode lead wire 1040 and a portion on the electromagnetic shield grounding lead wire 1050, and the portions not covered with the etching protective film are formed in holes 1045, 1055. One anchor part 1080' among the anchor parts 1080 of the diaphragm 1200 is positioned in the hole 1045 to electrically connect the diaphragm (movable electrode) 1200 to the movable electrode lead wire 1040 by bringing the anchor part 1080' in contact with the movable electrode lead wire 1040. An electric conductive body 1081 is positioned at the hole 1055 in a state of penetrating the insulation film 1210, and the electromagnetic shielding electric conductive film 1210 and the grounding lead wire 1050 are electrically connected through the electric conductive body 1081.

Figure 11:
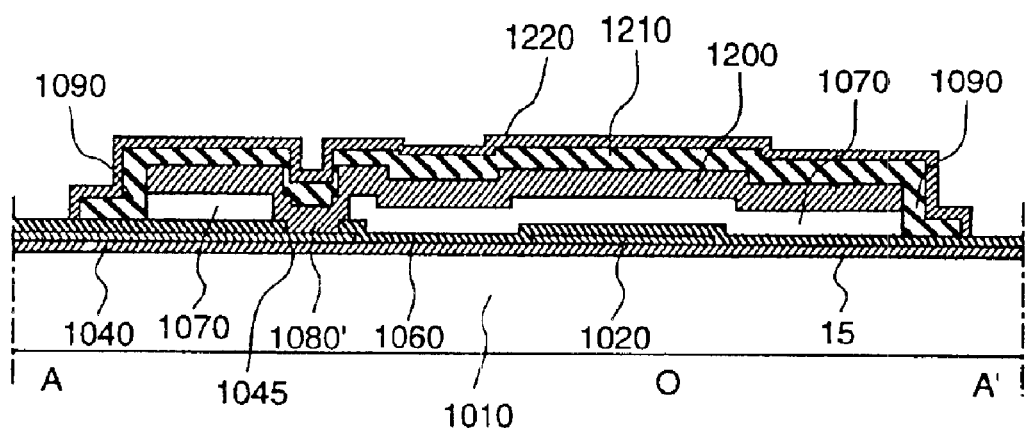
FIG. 11 is a cross-sectional view showing the semiconductor pressure sensor being taken on the plane of the line A-O-A' of FIG. 10.
Figure 12:
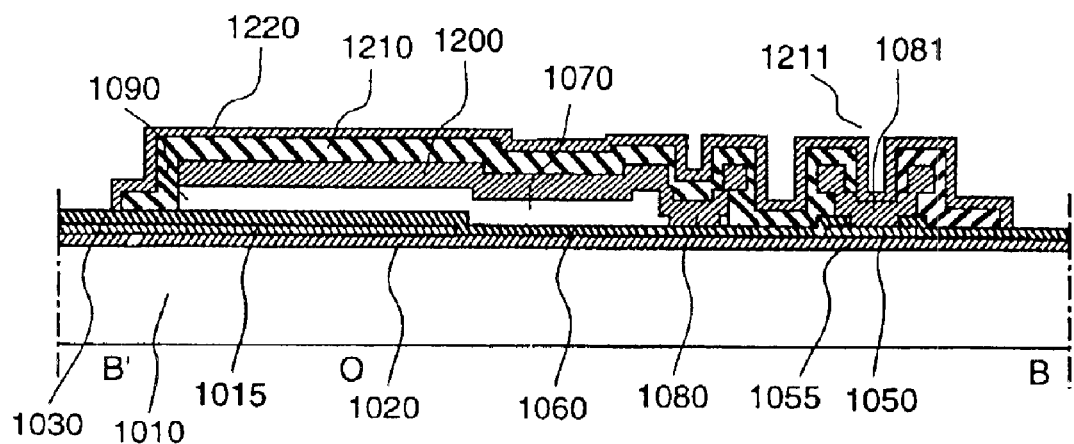
FIG. 12 is a cross-sectional view showing the semiconductor pressure sensor being taken on the plane of the line B-O-B' of FIG. 10.

In the figure of FIG. 9, all of the fixed electrode 1020 and the lead wire 1030, the diaphragm 1200 and the lead wire 1040, and the electromagnetic shielding electric conductive film 1220 and the grounding lead wire 1050 are illustrated on the substrate 1010. However, since it is difficult to actually illustrate all of them as shown in FIG. 11 and FIG. 12 using one cut of cross section, FIG. 9 conveniently shows all the main elements on one cross-sectional view in order to express the feature of the present invention.

When a pressure P of a fluid to be measured is applied onto the surface in the side opposite to the reference pressure chamber of the diaphragm laminated body composed of the diaphragm 1200, the insulation film 1210 and the electromagnetic shielding electric conductive film 1220, deformation (diaphragm displacement) in proportion to a pressure difference with the reference pressure chamber 1070 occurs in the diaphragm 1200. Accordingly, electrostatic capacitance between the diaphragm (movable electrode) 1200 and the fixed electrode 1020 is changed. The pressure P can be detected by outputting the change in the electrostatic capacitance as an electric signal.

According to the present construction, even if charged particles in the fluid to be measured are about to attach onto the surface of the diaphragm 1200, the diaphragm surface can be maintain in zero electrical potential by releasing the charge of the charged particles through the electromagnetic shielding electric conductive film 1220 and the grounding lead wire 1050 formed on the diaphragm surface. Further, the electromagnetic shielding electric conductive film 1220 prevents the electromagnetic wave noise which is produced by the charged particles in the fluid to be measured from entering into the sensor, and electrically shields the diaphragm 1200 from the external electromagnetic noise.

In the present embodiment, although the diaphragm 1200 serving as the movable electrode is an actual diaphragm, the diaphragm is formed in a three-layer diaphragm laminated body by laminating the insulation film 1210 and the electromagnetic shielding electric conductive film 1220 on the diaphragm 1200. (In this mean, the diaphragm 1200 can be also called as a first electric conductive diaphragm, the insulation film 1210 can be called as an insulation diaphragm, and the electromagnetic shielding electric conductive film 1220 can be called as a second electric conductive diaphragm.) The insulation film 1210 has only a role to electrically insulate between the electromagnetic shielding electric conductive film 1220 and the actual diaphragm 1200, and it is not necessary to increase its thickness in order to cope with attaching of the charged particles to the insulation film as in the conventional pressure sensor. Therefore, the insulation film can be thinned as thin as a decimal order μm (for instance, 0.2 μm). In addition to this, an acceptable thickness of the electromagnetic shield electric conductive film is also a decimal order μm (for instance, 0.5 μm). The thickness of the diaphragm including the two films can be made still thinner than that of the conventional one. As a result, the high sensitivity of the diaphragm can be maintained.

Figure 10:
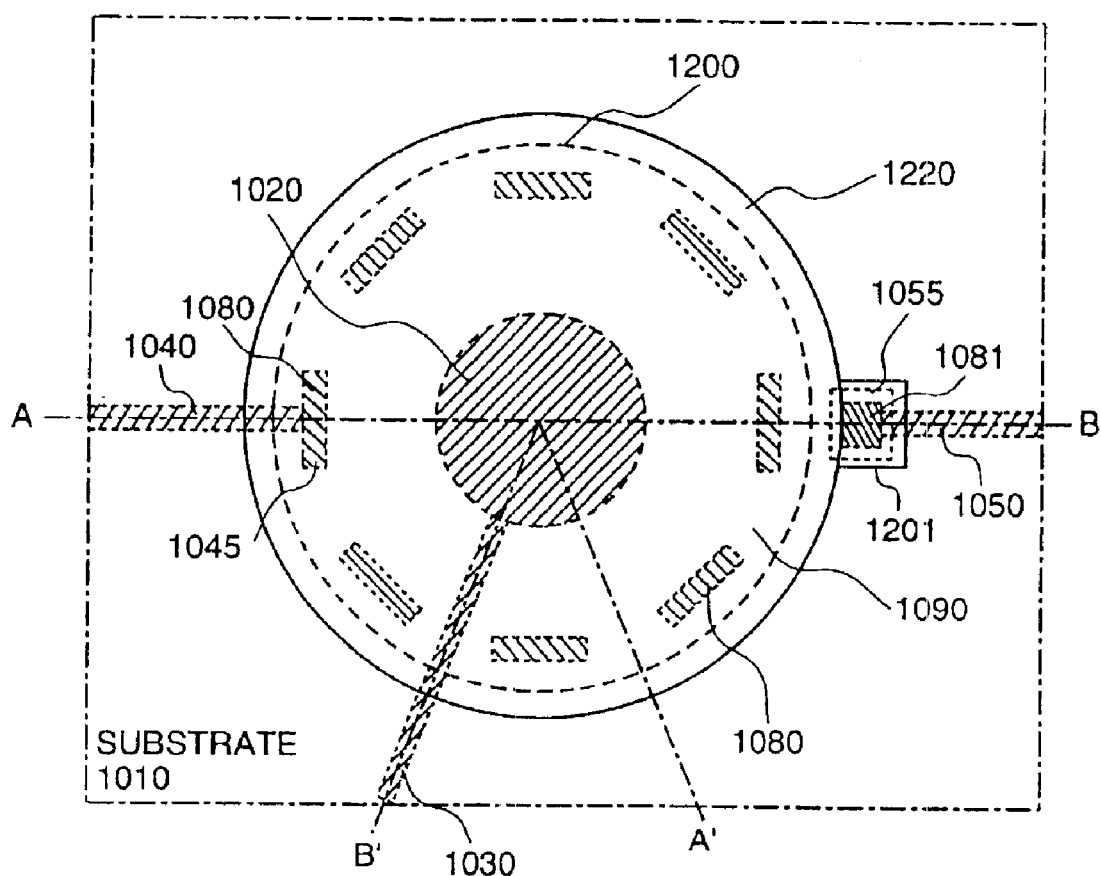
FIG. 10 is a plan view showing an embodiment of an electrostatic capacitive semiconductor pressure sensor in accordance with the present invention.

FIG. 10 is a plan view showing a detailed feature (an embodiment) embodied the above-mentioned principle of the present invention. FIG. 11 is a cross-sectional view showing the semiconductor pressure sensor being taken on the plane of the line A-O-A' of FIG. 10. FIG. 12 is a cross-sectional view showing the semiconductor pressure sensor being taken on the plane of the line B-O-B' of FIG. 10.

The fixed electrode 1020, the lead wire 1030, the diaphragm 1200 (the movable electrode), the movable electrode lead wire 1040, the connection part 1045, the anchor parts 1080, 1080', the electromagnetic shield grounding lead wire 1050, the connection part 1055, the electric conductive body 1081 and so on illustrated in FIG. 10 are not exposed to the external because they are actually covered with the electromagnetic shielding electric conductive film 1220 and the insulation film 1210. However, in FIG. 10, they are two-dimensionally elicited showing by broken lines as a matter of convenience of drawing.

The area shown by a broken line indicated by the reference character 1200 is the diaphragm, and the anchor parts 1080 for supporting the diaphragm 1200 are arranged in the circumferential direction with an equal spacing on the bottom surface area of the diaphragm 1200. AS described previously, one part 1080' among the anchor parts 1080 is electrically connected with the movable electrode lead wire 1040 at a position indicated by the reference character 45 (etching protective film removed portion). The diameter of the diaphragm 1200 is, for example, approximately φ300 μm.

The pressure sensor has a circular contour in plane, and one part of the circular contour is projected outward in the radial direction as shown by the reference character 1201, and the electromagnetic shielding electric conductive film 1220 is connected to the grounding lead wire 1050 at a position indicated by the reference character 1055 in the projecting part 1201 through the electric conductive body 1081.

The outer contour illustrated by a solid line indicated by the reference character 1220 is the pressure sensor in this embodiment, and FIG. 10 to FIG. 12 show a partial area of the substrate 1010 in a state of mounting the components (a pressure sensor mounting state). The basic construction is the same as described in the principle figure of FIG. 9.

Figure 13:
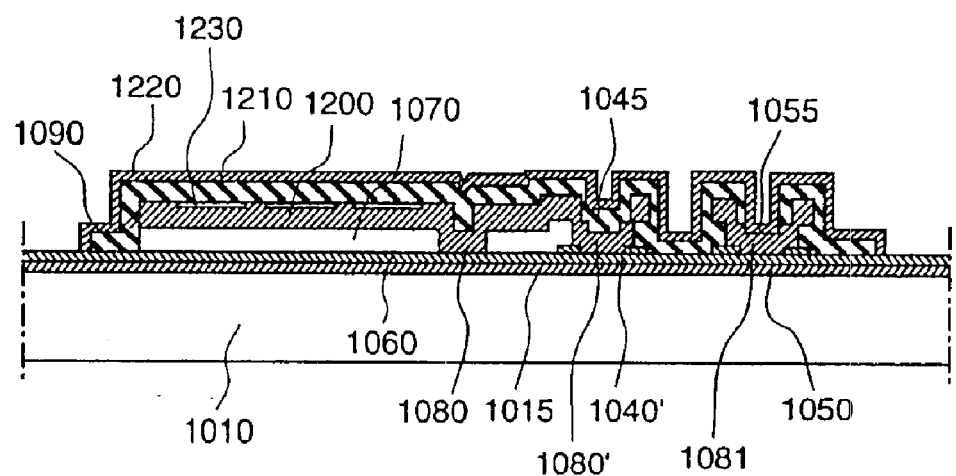
FIG. 13 is a plan view showing an embodiment of a piezo-resistive semiconductor pressure sensor in accordance with the present invention.

FIG. 13 is a principle figure showing a piezo-resistive semiconductor pressure sensor which the present invention is applied to. In the figure, the same reference character as the reference character shown in FIG. 9 to FIG. 12 indicates the same element or a common element.

In this embodiment, similar to the above-mentioned embodiment, a reference pressure chamber 1070 and a diaphragm 1200' surrounding the reference pressure chamber 1070 are formed on one surface of the semiconductor substrate 1010, and the diaphragm 1200' is displaced when a pressure of the fluid to be measured is applied onto the surface opposite to the reference pressure chamber. A piezo-resistive element 1230 for converting a detected pressure into an electric signal is formed in the diaphragm 1200'. The pressure receiving surface of the diaphragm 1200' to be in contact with the fluid to be measured is coated with the insulation film 1210, and the insulation film 1210 is further coated with the electromagnetic electric conductive film 1220 in a grounded state.

Further embodiments of the present invention will be described below, referring to the accompanied drawings.

The further embodiments in accordance with the present invention will be described below, referring to FIG. 14 to FIG. 17.

Figure 14:
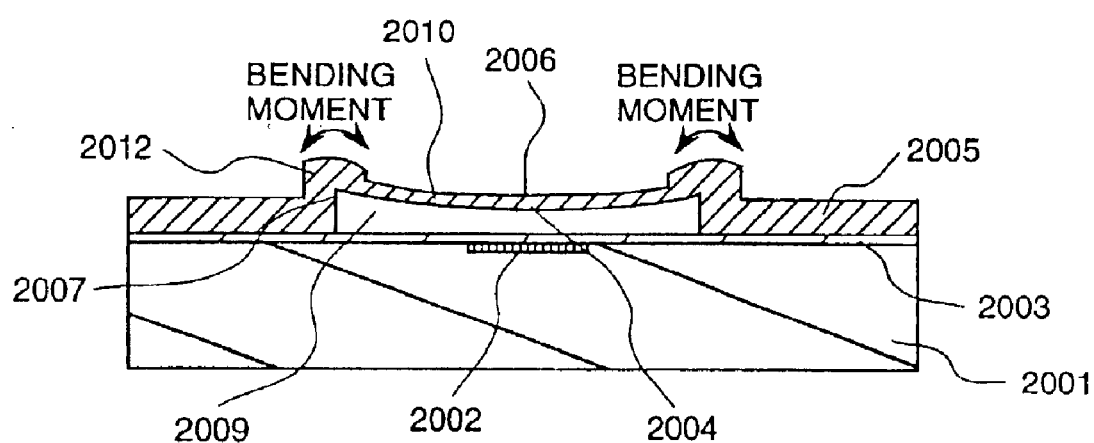
FIG. 14 is a cross-sectional view showing the main portion of a further embodiment of a capacitive pressure sensor in accordance with the present invention.
Figure 15:
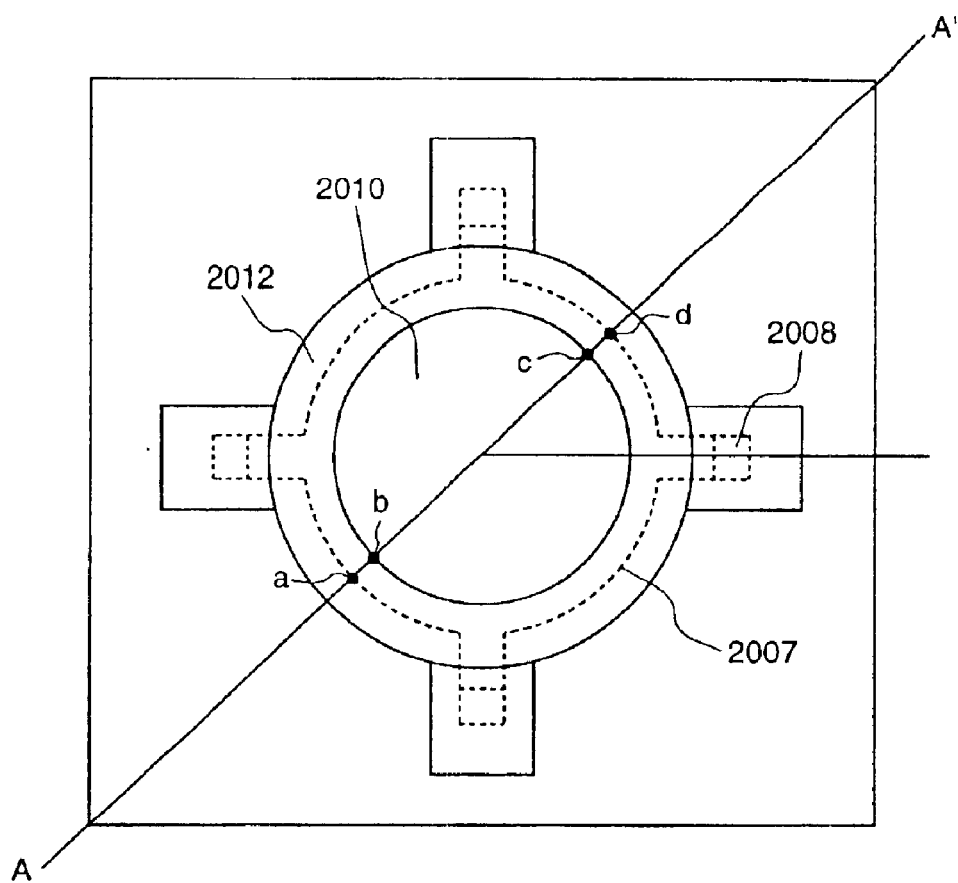
FIG. 15 is a plan view showing the capacitive pressure sensor shown in FIG. 14.
Figure 16:
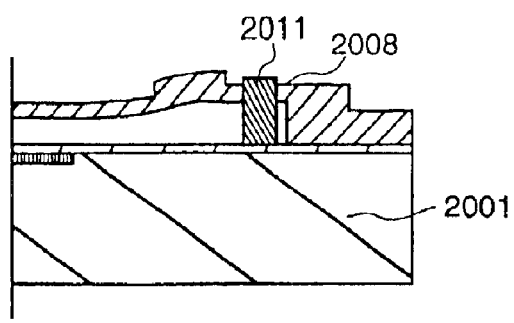
FIG. 16 is a cross-sectional view showing the main portion of the capacitive pressure sensor shown in FIG. 15.

FIG. 14 and FIG. 15 are a schematic cross-sectional view and a schematic plan view showing the capacitor portion of the embodiment of a capacitive pressure sensor in accordance with the present invention, respectively. FIG. 14 is a view showing a cross section being taken on the plane of the line A-A' of FIG. 15. FIG. 16 is a view showing a cross section being taken on the plane of the line O-B of FIG. 15.

Referring to FIG. 14 to FIG. 16, a substrate 2001 is made of single crystal silicon, and a fixed electrode 2002 treated so as to contain a p-type or an n-type impurity in a high concentration is formed on the main surface of the substrate 2001. Further, a substrate protective film 2003 having an anti-etching property is formed to cover over all the surface of the substrate 1.

On the surface of the substrate protective film 2003, a sacrifice film 2004 having an isotropic etching property is formed so as to cover a pressure receiving area. The sacrifice film 4 is to be removed in the manufacturing process, and accordingly the completed product does not have the sacrifice film 4.

Further, a diaphragm membrane 2005 is formed so as to cover the sacrifice film 2004. The diaphragm membrane 2005 is treated so as to contain a p-type or an n-type impurity in a high concentration to also serve as a movable electrode 2006. Electric wires and electrodes are formed in the fixed electrode 2002 and the movable electrode 6 in order to electrically connect with the external of the sensor.

A thick wall portion 2012 having a film thickness thicker than that of the neighboring portions is formed in the peripheral portion of the diaphragm membrane 2005, and the thick wall portion 2012 may be made of either of the same material as or a material different from that of the diaphragm if the internal stress is a compressive stress. Etching solution injection ports 2008 are formed in a form of an opening in the capacitance pressure sensor, and all the sacrifice film 2004 formed in advance is etched and removed through the etching solution injection ports 2008.

That is, by removing all the sacrifice film 2004, the reference pressure chamber 2009 surrounded by the substrate 2001 and the diaphragm membrane 2005 is formed and at the same time the movable diaphragm 2010 which is composed of the diaphragm membrane 2005 and the movable electrode 2006 film and placed in the upper surface side of the reference pressure chamber 2009 isolated from the substrate 1 is formed.

The capacitive pressure sensor is sealed by sealing all the etching solution injection ports 2008 with sealing caps 2011 under a vacuum atmosphere. By doing so, the reference pressure chamber 2009 is brought into a vacuum state, and the movable diaphragm 2010 is bent in proportion to an applied absolute pressure, and the electrostatic capacitance value between the fixed electrode 2002 and the movable electrode 2006 is changed by the bending. Therefore, by outputting the change in the electrostatic capacitance as an electric signal, the absolute pressure applied to the movable diaphragm 2010 can be measured.

Figure 17:
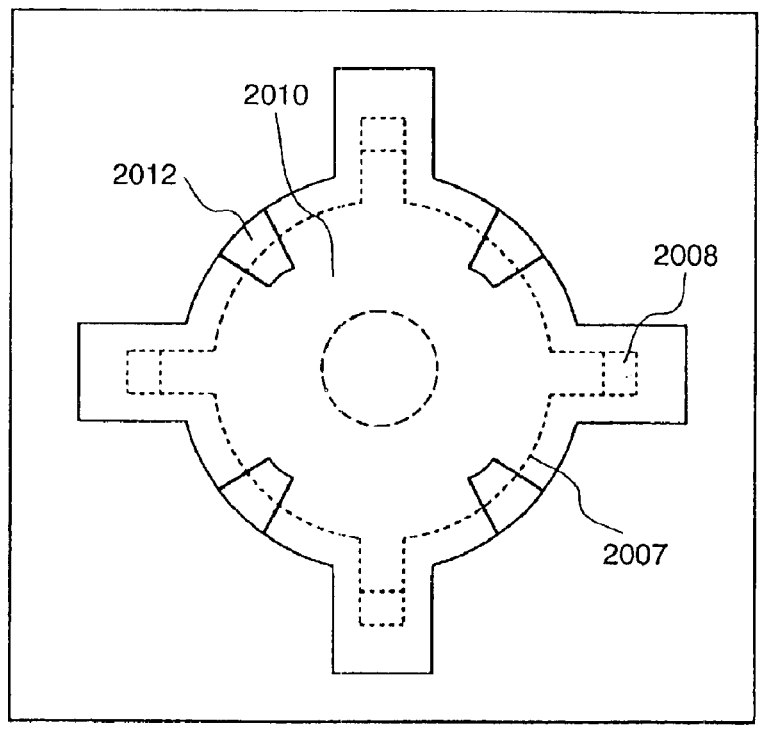
FIG. 17 is a view showing another embodiment a plan view of the capacitive pressure sensor shown in FIG. 14.

Although in FIG. 15 the thick wall portion 2012 having a film thickness thicker than that of the neighboring portions is formed in the upper position of the fixed portion of the movable diaphragm 2010, the arrangement of the thick wall portion 2012 is not limited to this. That is, for example, the thick wall portions 2012 may be formed in part of the upper position of the fixed portion of the movable diaphragm 2010 as shown in FIG. 17. However, it is preferable that the thick wall portions 2012 are placed at positions having good symmetry in respect of the shape of the movable diaphragm 2010, as shown in FIG. 17.

By doing so, when a detected pressure is applied to the pressure receiving surface of the movable diaphragm 2010 and the distance between the movable electrode 2006 and the fixed electrode 2002, the positional relationship of the movable electrode 2006 and the fixed electrode 2002 is changed in parallel so as to obtain a highly sensitive output.

In the capacitive pressure sensor having the above-described construction, the thick wall portion 2012 having a film thickness thicker than that of the neighboring portions is formed in the upper position of the fixed portion of the movable diaphragm 2010 in a case where the internal stress of the movable diaphragm 2010 is a compressive stress. Therefore, the movable diaphragm 2010 is stabilized in a concave deformed state to the main surface, that is, stabilized in a concave deformed state to the pressure receiving surface side by the action of a bending moment of the thick wall portion as shown in FIG. 14 even if the movable diaphragm is buckled.

Since the initial shape of the movable diaphragm 2010 (a state where a detected pressure is 0 (zero)) is the concave shape to the pressure receiving surface side, the deformation of the movable diaphragm 2010 does not change from the convex shape to the pressure receiving surface to the concave shape even if the movable diaphragm is deformed by applying a detected pressure to the pressure receiving surface of the movable diaphragm 2010. Therefore, the deformation of the movable diaphragm 2010 is continuously changed, and accordingly the electric capacitance is continuously changed to obtain a continuous output.

In the case where the internal stress of the movable diaphragm 2010 is a tensile stress, the movable diaphragm 2010 is in a state pulled from the diaphragm fixing portion 2007. Therefore, the movable diaphragm 2010 does not buckle, and the deformation of the movable diaphragm 2010 is continuously changed to the detected pressure, and as a result the electric capacitance is continuously changed to obtain a continuous output.

Thus, in the above embodiment of the capacitance pressure sensor in accordance with the present invention, the movable diaphragm 2010 is not deformed in a convex shape toward the pressure receiving surface side whichever the internal stress of the movable diaphragm 2010 is a compressive stress or a tensile stress. Consequently, the deformation of the movable diaphragm 2010 is continuously changed, and accordingly the electric capacitance is continuously changed to obtain a continuous output.

Therefore, it is possible to realize the capacitive pressure sensor which can prevent the movable diaphragm from becoming in the convex deformed state to the pressure receiving surface side without adding any high temperature heat treatment, and in which the electric-capacitance can be continuously changed in respect to an applied pressure change.

An example of dimensions of the main portions will be described below when the diaphragm 2005 is made of polycrystalline silicon in the above embodiment described above.

The thickness dimension $t_1$ of the thin portion of the movable diaphragm 2010 is approximately 5 μm, and the thickness dimension $t_2$ of the thick wall portion 2012 of the movable diaphragm 2010 is approximately 2010 μm. The diameter $L_1$ (the distance from a point a to a point d in FIG. 15) of the movable diaphragm 2010 is approximately 200 μm, and the diameter $L_2$ (the distance from a point b to a point c in FIG. 15) of the thin portion of the movable diaphragm 2010 is approximately 180 μm.

Figure 18:
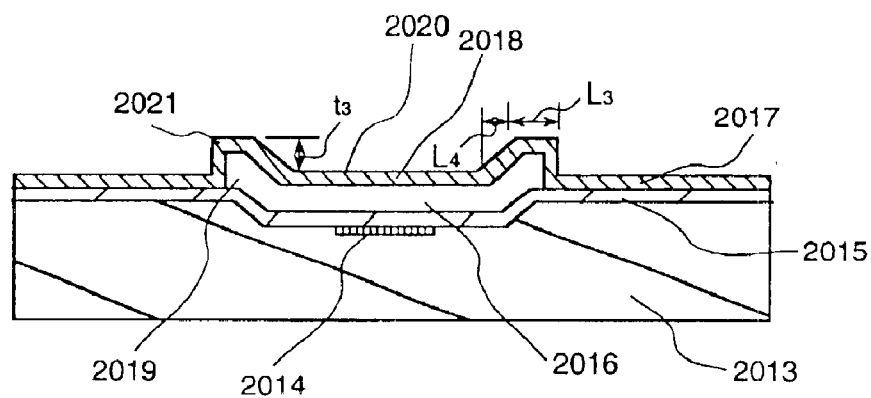
FIG. 18 is a cross-sectional view showing the main portion of a further embodiment of a capacitive pressure sensor in accordance with the present invention.

Furthermore other embodiment in accordance with the present invention will be described below, referring to FIG. 18. FIG. 18 is a cross-sectional view showing the main portion of the embodiment of a capacitive pressure sensor in accordance with the present invention.

In FIG. 18, a substrate 2013 is made of single crystal silicon and worked so that a part of the substrate is formed in a concave shape toward the pressure receiving surface side through etching or the like, and a fixed electrode 14 treated so as to contain a p-type or an n-type impurity in a high concentration is formed in the center of the concave portion on the surface of the substrate.

Further, a substrate protective film 2015 having an anti-etching property is formed to cover over all the surface of the substrate 2013. On the surface of the substrate protective film 2015, a sacrifice film 16 having an isotropic etching property is formed so as to cover the concave portion of the substrate 2013.

The sacrifice film 16 is to be removed in the manufacturing process, and accordingly the completed product does not have the sacrifice film 2004.

Further, a diaphragm membrane 2017 is formed so as to cover the sacrifice film 2016. The diaphragm membrane 2017 is treated so as to contain a p-type or an n-type impurity in a high concentration to also serve as a movable electrode 2018.

Electric wires and electrodes are formed in the fixed electrode 2014 and the movable electrode 2018 in order to electrically connect with the external of the sensor. The sacrifice film 2016 formed on the surface of the concave portion of the substrate 2013 and the diaphragm membrane 2017 totally have a concave shape toward the pressure receiving surface along the concave portion of the substrate 2013.

Further, similar to the above embodiment of the capacitance pressure sensor shown in FIG. 14, this capacitance pressure sensor has an etching solution injection port formed in a form of an opening. All the sacrifice film 2016 is removed through etching to form the reference pressure chamber 2019 and the movable diaphragm 2020.

By sealing all the etching solution injection ports with sealing caps under a vacuum atmosphere, the reference pressure chamber 2019 is brought into a vacuum state. Similar to the operation principle of the embodiment shown in FIG. 14, the absolute pressure applied to the movable diaphragm 2020 can be measured by outputting the change in the electrostatic capacitance as an electric signal.

In the capacitive pressure sensor having the above-mentioned construction, since the total shape of the movable diaphragm 2020 is the concave shape to the pressure receiving surface side, the movable diaphragm 2020 is deformed in the concave shape to the pressure receiving surface side by the internal stress of the diaphragm membrane 205 even if the movable diaphragm 2020 is buckled. Therefore, when the movable diaphragm 2020 is deformed by applying a pressure onto the pressure receiving surface of the movable diaphragm 2020, the deformation of the movable diaphragm 2020 is continuously changed, and accordingly the electric capacitance is continuously changed to obtain a continuous output.

In the case where the internal stress of the movable diaphragm 2020 is a tensile stress, the movable diaphragm 2020 is in a state pulled from the diaphragm fixing portion 2021. Therefore, the movable diaphragm 2020 does not buckle, and the deformation of the movable diaphragm 2020 is continuously changed to the detected pressure, and as a result the electric capacitance is continuously changed to obtain a continuous output.

Thus, in the capacitance pressure sensor in accordance with the present invention, the movable diaphragm 2020 is not deformed in a convex shape toward(the pressure receiving surface side whichever the internal stress of the movable diaphragm 2020 is a compressive stress or a tensile stress. As a result, the deformation of the movable diaphragm 20 is continuously changed, and accordingly the electric capacitance is continuously changed to obtain a continuous output.

Therefore, it is possible to realize the capacitive pressure sensor which can prevent the movable diaphragm from becoming in the convex deformed state to the pressure receiving surface side without adding any high temperature heat treatment, and in which the electric capacitance can be continuously changed in respect to an applied pressure change.

An example of dimensions of the main portions will be described below when the diaphragm 2005 is made of polycrystalline silicon in the embodiment described above.

The maximum inner diameter $L_1$ of the movable diaphragm 2020 is approximately 200 $\mu$m, the width dimension $L_3$ of the diaphragm fixing portion 21 is approximately 10 $\mu$m, the width dimension $L_4$ of the step portion of the movable diaphragm 2020 is approximately 10 $\mu$m, and the step dimension $t_3$ of movable diaphragm 2020 is approximately 5 $\mu$m.

Figure 19:
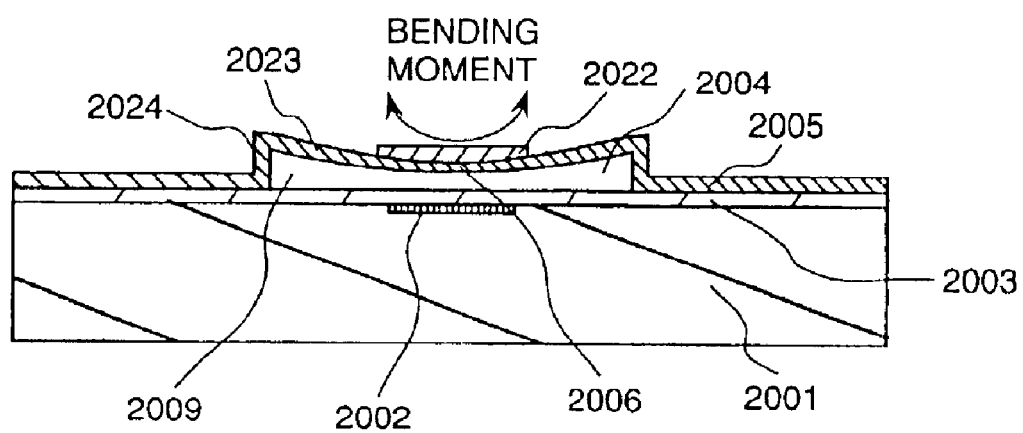
FIG. 19 is a cross-sectional view showing the main portion of a further embodiment of a capacitive pressure sensor in accordance with the present invention.

The further embodiment in accordance with the present invention will be described below, referring to FIG. 19. In this embodiment, parts corresponding to parts in the embodiment shown in FIG. 14 are identified by the same reference characters. FIG. 19 is a cross-sectional view showing the main portion of the embodiment of a capacitive pressure sensor in accordance with the present invention.

Referring to FIG. 19, a substrate 2001 is made of single crystal silicon, and a fixed electrode 2002 treated so as to contain a p-type or an n-type impurity in a high concentration is formed on the main surface of the substrate 2001.

Further, a substrate protective film 2003 having an anti-etching property is formed to cover over all the surface of the substrate 2001. On the surface of the substrate protective film 2003, a sacrifice film 2004 having an isotropic etching property is formed so as to cover a pressure receiving area.

The sacrifice film 2004 is to be removed in the manufacturing process, and accordingly the completed product does not have the sacrifice film 2004. Further, a diaphragm membrane 2005 is formed so as to cover the sacrifice film 2004. The diaphragm membrane 2005 is treated so as to contain a p-type or an n-type impurity in a high concentration to also serve as a movable electrode 2006.

Further, electric wires and electrodes are formed in the fixed electrode 2002 and the movable electrode 2006 in order to electrically connect with the external of the sensor. Furthermore, a disk-shaped film 2022 having an internal stress of a tensile stress is formed in the central portion of the diaphragm membrane 2005. However, it is preferable that the film 2022 is placed at position having good symmetry in respect of the shape of the movable diaphragm 2010. By doing so, when a detected pressure is applied to the pressure receiving surface of the movable diaphragm 2010 and the distance between the-movable electrode 2006 and the fixed electrode 2002, the positional relationship of the movable electrode 6 and the fixed electrode 2002 is changed in parallel so as to obtain a highly sensitive output.

The capacitive pressure sensor has etching solution injection ports 2008 formed in a form of an opening, and all the sacrifice film 2004 formed in advance is etched and removed through the etching solution injection ports 2008.

That is, by removing all the sacrifice film 2004, the reference pressure chamber 2009 surrounded by the substrate 2001 and the diaphragm membrane 2005 is formed and at the same time the movable diaphragm 2023 which is composed of the diaphragm membrane 2005 and the movable electrode 2006 film and placed in the upper surface side of the reference pressure chamber 2009 isolated from the substrate 1 is formed.

The capacitive pressure sensor is sealed by sealing all the etching solution injection ports 2008 with sealing caps 2009 under a vacuum atmosphere. By doing so, the reference pressure chamber 2009 is brought into a vacuum state, and the movable diaphragm 2023 is bent in proportion to an applied absolute pressure, and the electrostatic capacitance value between the fixed electrode 2002 and the movable electrode 2006 is changed by the bending.

Therefore, by outputting the change in the electrostatic capacitance as an electric signal, the absolute pressure applied to the movable diaphragm 2023 can be measured.

In the above embodiment of the capacitive pressure sensor having the above-mentioned construction, in a case where the inner stress of the movable diaphragm 2023 is a compressive stress, since the film 2022 having an internal stress of a tensile stress is formed on the upper portion in the central portion of the movable diaphragm 2023 is formed, the movable diaphragm 2023 is deformed in the concave shape to the pressure receiving surface side by action of bending moment as shown in FIG. 19 even if the movable diaphragm 2023 is buckled.

Therefore, when the movable diaphragm 2023 is deformed by applying a pressure onto the pressure receiving surface of the movable diaphragm 2023, the deformation of the movable diaphragm 2023 is continuously changed, and accordingly the electric capacitance is continuously changed to obtain a continuous output.

In the case where the internal stress of the movable diaphragm 2023 is a tensile stress, the movable diaphragm 2023 is in a state pulled from the movable diaphragm fixing portion 2024. Therefore, the movable diaphragm 2023 does not buckle, and the deformation of the movable diaphragm 2023 is continuously changed to the detected pressure, and as a result the electric capacitance is continuously changed to obtain a continuous output.

Thus, in this embodiment of the capacitance pressure sensor in accordance with the present invention, the movable diaphragm 2023 is not deformed in a convex shape toward the pressure receiving surface side whichever the internal stress of the movable diaphragm 2023 is a compressive stress or a tensile stress. As a result, the deformation of the movable diaphragm 2023 is continuously changed, and accordingly the electric capacitance is continuously changed to obtain a continuous output.

Therefore, it is possible to realize the capacitive pressure sensor which can prevent the movable diaphragm from becoming in the convex deformed state to the pressure receiving surface side without adding any high temperature heat treatment, and in which the electric capacitance can be continuously changed in respect to an applied pressure change.

In the embodiment described above, in a case where the diaphragm 2023 is made of polycrystalline silicon, an example of dimensions is as follows. The inner diameter of the reference pressure chamber 2009 is 200 μm, the diameter of the disk-shaped film 2022 is 20 μm. However, although the film 2022 is disk-shape in the above embodiment, the shape is not limited to the disk-shape but a polygon film may be used.

Figure 20:
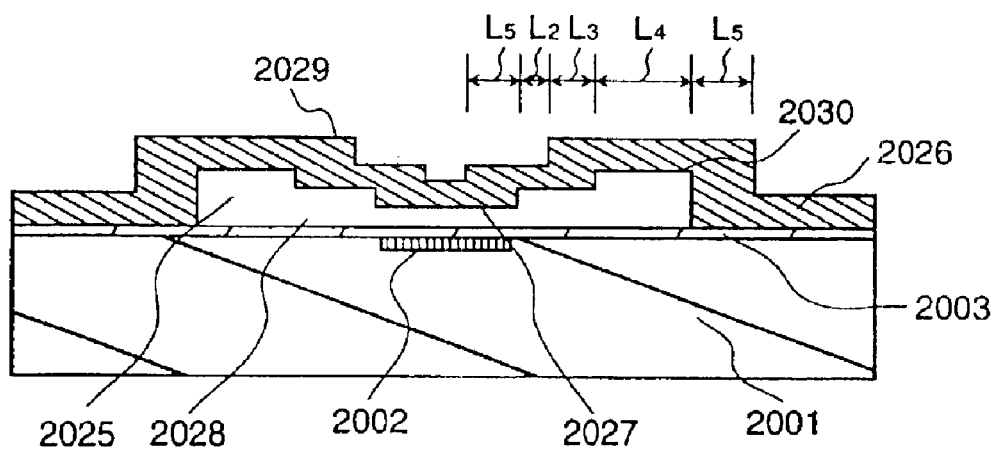
FIG. 20 is a cross-sectional view showing the main portion of a further embodiment of a capacitive pressure sensor in accordance with the present invention.

The further embodiment in accordance with the present invention will be described below, referring to FIG. 20. In this embodiment, parts corresponding to parts in the embodiment shown in FIG. 14 are identified by the same reference characters. FIG. 20 is a cross-sectional view showing the main portion of the embodiment of a capacitive pressure sensor in accordance with the present invention.

Referring to FIG. 20, a substrate 2001 is made of single crystal silicon, and a fixed electrode 2002 treated so as to contain a p-type or an n-type impurity in a high concentration is formed on the main surface of the substrate 2001. Further, a substrate protective film 2003 having an anti-etching property is formed to cover over all the surface of the substrate 2001.

On the surface of the substrate protective film 2003, a sacrifice film 2025 having an isotropic etching property is formed so as to cover a pressure receiving area, and the sacrifice film 2025 is selectively etched so as to be formed in a concave shape to the pressure receiving surface side.

That is, the sacrifice film 2025 has a flat surface in one surface of the substrate 2001 side, but in the other surface in the reverse side of the substrate 2001 has a stair shape having two steps increasing from the central portion toward the peripheral direction. Thereby, the sacrifice film 2025 is concave to the pressure receiving surface side.

The sacrifice film 2025 is to be removed in the manufacturing process, and accordingly the completed product does not have the sacrifice film 2025.

Further, a diaphragm membrane 2026 is formed so as to cover the sacrifice film 2025. The diaphragm membrane 2026 is formed in a concave shape to the pressure receiving surface side so as follow the surface shape of the sacrifice film 2025 of a base film. Further, the diaphragm membrane 2026 is treated so as to contain a p-type or an n-type impurity in a high concentration to also serve as a movable electrode 2027.

Further, electric wires and electrodes are formed in the fixed electrode 2002 and the movable electrode 2027 in order to electrically connect with the external of the sensor.

Similar to the embodiment of the sensor shown in FIG. 14, the capacitive pressure sensor has etching solution injection ports formed in a form of an opening, and all the sacrifice film 2025 is etched and removed through the etching solution injection ports. By doing so, the reference pressure chamber 2028 and the movable diaphragm 2029 are formed. Then, the capacitive pressure sensor is sealed by sealing all the etching solution injection ports with sealing caps under a vacuum atmosphere. Thus, the reference pressure chamber 2028 is brought into a vacuum state. Similarly to the operating principle of the embodiment shown in FIG. 14, by outputting the change in the electrostatic capacitance varied by an applied pressure as a detected pressure signal, the absolute pressure applied to the movable diaphragm 2029 can be measured.

In the capacitive pressure sensor having the above-mentioned construction, since the total shape of the movable diaphragm 2029 is the concave shape to the pressure receiving surface side, the movable diaphragm 2029 is deformed in the concave shape to the pressure receiving surface side even if the movable diaphragm 2029 is buckled.

Therefore, when the diaphragm is deformed by applying a detected pressure onto the pressure receiving surface of the diaphragm, the deformation of the diaphragm is continuously changed, and as a result the electric capacitance is continuously changed and a continuous output can be obtained.

In the case where the internal stress of the movable diaphragm 2029 is a tensile stress, the movable diaphragm 2029 is in a state pulled from the diaphragm fixing portion 2030. Therefore, the movable diaphragm 2029 does not buckle, and the deformation of the movable diaphragm 2029 is continuously changed to the detected pressure, and as a result the electric capacitance is continuously changed and a continuous output can be obtained.

Thus, in this embodiment of the capacitance pressure sensor in accordance with the present invention, the movable diaphragm 2029 is not deformed in a convex shape toward the pressure receiving surface side whichever the internal stress of the movable diaphragm 2029 is a compressive stress or a tensile stress. As a result, the deformation of the movable diaphragm 2029 is continuously changed, and accordingly the electric capacitance is continuously changed and a continuous output can be obtained.

Therefore, it is possible to realize the capacitive pressure sensor which can prevent the movable diaphragm from becoming in the convex deformed state to the pressure receiving surface side without adding any high temperature heat treatment, and in which the electric capacitance can be continuously changed in respect to an applied pressure change.

An example of dimensions will be described below when the diaphragm 2005 is made of polycrystalline silicon in this embodiment described above.

The inner diameter of the reference pressure chamber 2028 is approximately 200 μm, the dimension $L_9$ from the outer peripheral portion to the inner peripheral surface of the diaphragm 2026 is approximately 5 μm, the dimension $L_8$ from the inner peripheral surface of the diaphragm 2026 to a first step-shaped portion of the inner surface is approximately 10 μm, the dimension $L_7$ from the first step-shaped portion of the inner surface to a first step-shaped portion of the outer surface is approximately 5 μm, the dimension $L_6$ from the first step-shaped portion of the outer surface to a second step-shaped portion of the inner surface is approximately 10 µm, and the dimension $L_5$ from the second step-shaped portion of the inner surface to a second step-shaped portion of the outer surface is approximately 5 µm.

Figure 21:
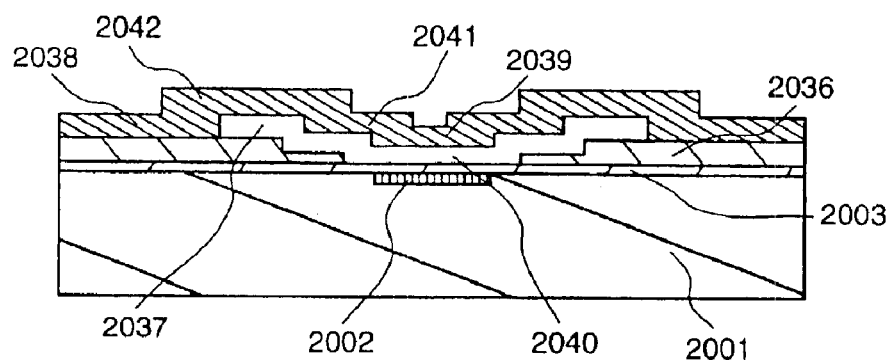
FIG. 21 is a cross-sectional view showing the main portion of a further embodiment of a capacitive pressure sensor in accordance with the present invention.

The further embodiment in accordance with the present invention will be described below, referring to FIG. 21. In this embodiment, parts corresponding to parts in the embodiment shown in FIG. 14 are identified by the same reference characters. FIG. 21 is a cross-sectional view showing the main portion of the embodiment of a capacitive pressure sensor in accordance with the present invention.

Referring to FIG. 21, a substrate 2001 is made of single crystal silicon, and a fixed electrode 2002 treated so as to contain a p-type or an n-type impurity in a high concentration is formed on the main surface of the substrate 2001. Further, a substrate protective film 2003 having an anti-etching property is formed to cover over all the surface of the substrate 2001.

On the surface of the substrate protective film 2003, a film 2036 such as a polycrystalline silicon film is formed in a step concave shape to the pressure receiving surface side so as to cover the surrounding of the fixed electrode 2002. Further, a sacrifice film 2037 having an isotropic etching property is formed so as to cover the pressure receiving area. The sacrifice film is formed following to the shape of the film 2036 of the base film, and has a stair shape similar to the that of the film 2036. The sacrifice film 2037 is to be removed in the manufacturing process, and accordingly the completed product does not have the sacrifice film 2037.

Further, a diaphragm membrane 2038 is formed so as to cover the sacrifice film 2037. The diaphragm membrane 2038 is formed in a concave stair shape to the pressure receiving surface side so as follow the surface shape of the sacrifice film 2037 of a base film. Further, the diaphragm membrane 2038 is treated so as to contain a p-type or an n-type impurity in a high concentration to also serve as a movable electrode 2039. Further, electric wires and electrodes are formed in the fixed electrode 2002 and the movable electrode 2039 in order to electrically connect with the external of the sensor.

Similar to the embodiment of the sensor shown in FIG. 14, the capacitive pressure sensor has etching solution injection ports formed in a form of an opening, and all the sacrifice film 2037 is etched and removed through the etching solution injection ports. By doing so, the reference pressure chamber 2040 and the movable diaphragm 2041 are formed. Then, the capacitive pressure sensor is sealed by sealing all the etching solution injection ports with sealing caps under a vacuum atmosphere. Thus, the reference pressure chamber 2040 is brought into a vacuum state. Similarly to the operating principle of the embodiment shown in FIG. 14, by outputting the change in the electrostatic capacitance varied by an applied pressure as a detected pressure signal, the absolute pressure applied to the movable diaphragm 2041 can be measured.

In the capacitive pressure sensor having the above-mentioned construction, since the total shape of the movable diaphragm 2041 is the concave shape to the pressure receiving surface side, the movable diaphragm 2041 is deformed in the concave shape to the pressure receiving surface side even if the movable diaphragm 2041 is buckled.

Therefore, when the movable diaphragm 2041 is deformed by applying a detected pressure onto the pressure receiving surface of the movable diaphragm 2041, the deformation of the diaphragm is continuously changed, and as a result the electric capacitance is continuously changed and a continuous output can be obtained.

In the case where the internal stress of the movable diaphragm 2041 is a tensile stress, the movable diaphragm 2041 is in a state pulled from the diaphragm fixing portion 2042. Therefore, the movable diaphragm 2041 does not buckle, and the deformation of the movable diaphragm 2041 is continuously changed to the detected pressure, and as a result the electric capacitance is continuously changed and a continuous output can be obtained.

Thus, in the capacitance pressure sensor in accordance with the present invention, the movable diaphragm 2041 is deformed in a concave shape toward the pressure receiving surface side whichever the internal stress of the movable diaphragm 2041 is a compressive stress or a tensile stress. As a result, the deformation of the movable diaphragm 2041 is continuously changed, and accordingly the electric capacitance is continuously changed and a continuous output can be obtained.

Therefore, it is possible to realize the capacitive pressure sensor which can prevent the movable diaphragm from becoming in the convex deformed state to the pressure receiving surface side without adding any high temperature heat treatment, and in which the electric capacitance can be continuously changed in respect to an applied pressure change.

In the embodiment described above when the diaphragm 2041 is made of polycrystalline silicon, an example of dimensions is the same as that in the embodiment shown in FIG. 20. However, the distance between the surface of the film 2036 in the diaphragm 2041 side and the surface of the diaphragm 4201 in the substrate 2001 side is 1 µm.

Figure 22:
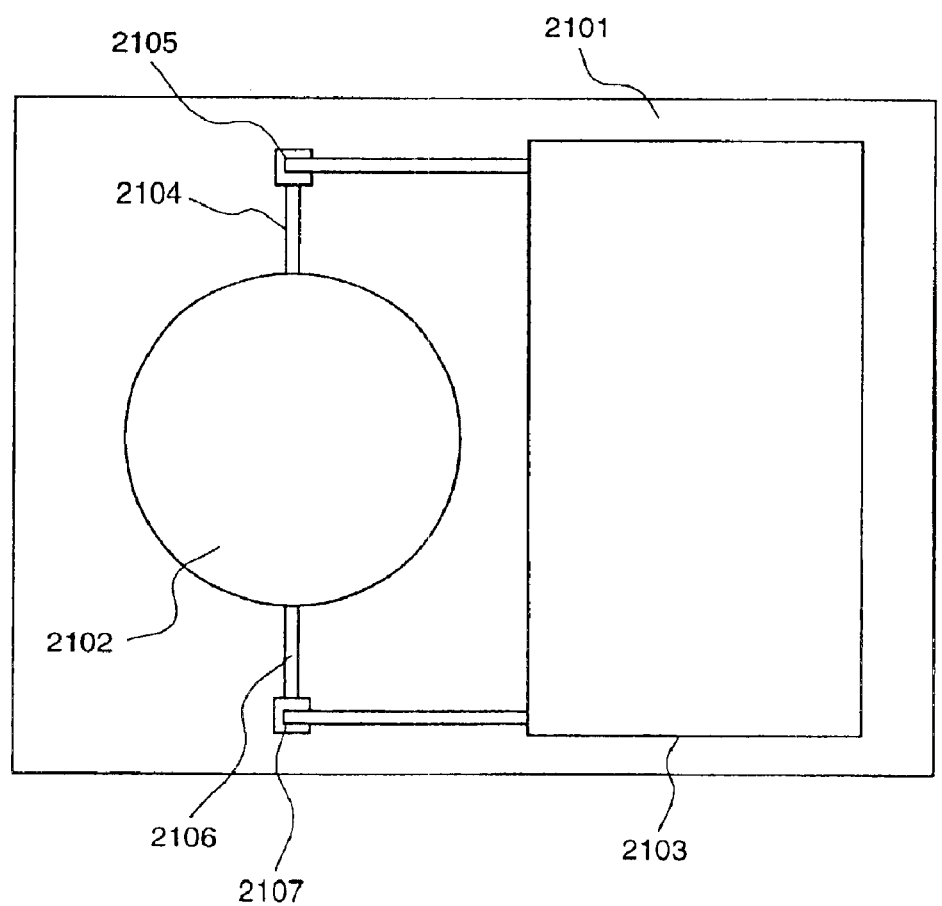
FIG. 22 is a plan view showing the main portion of a further embodiment of a capacitive pressure sensor in accordance with the present invention.

The further embodiment in accordance with the present invention will be described below, referring to FIG. 22. FIG. 22 is a plan view showing the embodiment of a capacitive pressure sensor in accordance with the present invention. One of the embodiment of the capacitive pressure sensor 2102 stated above is formed in a predetermined position on a single crystal silicon substrate 2101.

In the single crystal silicon substrate 2101, a circuit portion 2103 is formed using a semiconductor manufacturing technology. The circuit portion 2103 is composed of a switched capacitor type capacitance detecting circuit for converting a capacitance change of a capacitor part of the capacitive pressure sensor 2102 to a voltage.

The fixed electrode and the movable electrode of the capacitive pressure sensor 2102 are connected to the circuit portion 2103 through a fixed electrode lead wire 2104 and a fixed electrode output terminal 2105, a movable electrode lead wire 2106 and a movable electrode output terminal 2107, respectively.

By forming the circuit portion in a single substrate as described above, the capacitive pressure sensor capable of obtaining an electric output can be manufactured by one semiconductor process, and accordingly the capacitive pressure sensor can be made small in size and low in cost.

In the embodiments described above, the capacitive pressure sensor is constructed in such that both of the surface of the movable diaphragm 2010 opposite to the main surface of the substrate 2001 and the surface of the movable diaphragm 2010 in the reverse side of the opposite surface have a convex shape to the main surface of the substrate 2001 in the initial state where a detected pressure is 0 (zero). However, the similar effect can be attained in a case where the capacitive pressure sensor is constructed in such that at least one of the surface of the movable diaphragm 2010 opposite to the main surface of the substrate 1 and the surface of the movable diaphragm 2010 in the reverse side of the opposite surface has a convex shape to the main surface of the substrate 1 in the initial state where a detected pressure is 0 (zero).

What is claimed is:

1. A semiconductor pressure sensor comprising a diaphragm which is deformed in correspondence with a pressure of fluid to be measured, wherein
    said diaphragm is made of an electrically conductive polycrystalline silicon film formed by using a process for etching a sacrifice layer on one surface of a silicon substrate,
    a pressure receiving surface of said diaphragm which is contacted to said fluid is covered with an insulation film, and
    said pressure receiving surface covered with said insulation film is further covered with an electrically conductive film for electromagnetic shielding which is made of an electrically conductive polycrystalline silicon film and is in a grounded state
    said insulation film and said electrically conductive film for said electromagnetic shielding are formed on a surface of said silicon substrate where said diaphragm is not formed, a lead for grounding is formed so as to be covered with said insulation film and said electrically conductive film for said electromagnetic shielding, and said electrically conductive film for said electromagnetic shielding is connected to said lead for grounding through a hole provided on said insulation film.

2. The semiconductor pressure sensor according to claim 1, wherein
    a fixed electrode is arranged on said silicon substrate at a position against said diaphragm, said diaphragm is constructed as a movable electrode, and said pressure is detected by converting a capacitance between said movable electrode and said fixed electrode into an electrical signal.

* * * * *